US009366540B2

(12) United States Patent
Chien

(10) Patent No.: US 9,366,540 B2
(45) Date of Patent: Jun. 14, 2016

(54) FACILITATING LOCATION DETERMINATION EMPLOYING VEHICLE MOTION DATA

(71) Applicant: AT&T Mobility II LLC, Atlanta, GA (US)

(72) Inventor: Ginger Chien, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 14/522,063

(22) Filed: Oct. 23, 2014

(65) Prior Publication Data

US 2016/0116291 A1    Apr. 28, 2016

(51) Int. Cl.
G01C 21/26    (2006.01)
G06F 19/00    (2011.01)

(52) U.S. Cl.
CPC ...................... *G01C 21/26* (2013.01)

(58) Field of Classification Search
CPC .............................. G01C 21/26; G01C 21/165
USPC ................. 701/519, 41, 472, 500; 342/357.3, 342/357.62, 357.31; 340/438, 995.25
See application file for complete search history.

(56) References Cited

U.S. PATENT DOCUMENTS

| 3,478,195 | A | | 11/1969 | Mayne |
| 4,541,049 | A | | 9/1985 | Ahlbom |
| 4,633,407 | A | | 12/1986 | Freienstein et al. |
| 5,075,864 | A | | 12/1991 | Sakai |
| 5,416,712 | A | * | 5/1995 | Geier .................. G01C 21/165 342/357.3 |
| 5,642,106 | A | | 6/1997 | Hancock et al. |
| 5,893,043 | A | | 4/1999 | Moehlenbrink et al. |
| 6,577,952 | B2 | | 6/2003 | Strother et al. |
| 6,836,729 | B2 | | 12/2004 | Tanaka et al. |

(Continued)

FOREIGN PATENT DOCUMENTS

| EP | 0207989 B1 | 7/1992 |
| JP | 60188810 A | 9/1985 |

(Continued)

OTHER PUBLICATIONS

Fuke, et al., "Dead Reckoning for a Lunar Rover on Uneven Terrain," Proceedings of the 1996 IEEE, International Conference on Robotics and Automation, Apr. 1996, pp. 411-416, IEEE, Retrieved on Aug. 6, 2014.

Chung, et al., "Sensor Fusion for Mobile Robot Dead-Reckoning with a Precision-Calibrated Fiber Optic Gyroscope," 2001 IEEE International Conference on Robotics and Automation, May 2001, pp. 3588-3593, IEEE, Retrieved on Aug. 6, 2014.

(Continued)

*Primary Examiner* — Tan Q Nguyen
(74) *Attorney, Agent, or Firm* — Amin, Turocy & Watson, LLP

(57) ABSTRACT

Location determination is facilitated based on motion data accumulated at a vehicle in cases in which a beacon is not available. One method includes receiving, by a first device, first information about a vehicle indicative of a position and a direction of the vehicle. The position is measured by the vehicle based on a measured angular rotation rate and radius of a wheel of the vehicle and the direction of the vehicle is measured by the vehicle based on a measured amount of a turn radius of a steering wheel device of the vehicle. The method also includes determining a previously determined location of the vehicle. The method also includes generating second information about a location of the first device based on the previously determined location of the vehicle and the first information. Error estimates for the location and/or tuning bias for sensors at the vehicle can also be determined.

20 Claims, 17 Drawing Sheets

(56) References Cited

U.S. PATENT DOCUMENTS

| | | | |
|---|---|---|---|
| 7,042,345 B2 | 5/2006 | Ellis | |
| 7,184,887 B2 * | 2/2007 | Wood | G01C 21/12 342/357.62 |
| 7,774,158 B2 | 8/2010 | Domingues et al. | |
| 7,899,599 B2 | 3/2011 | Makela et al. | |
| 8,195,392 B2 | 6/2012 | Watanabe et al. | |
| 8,239,133 B2 * | 8/2012 | Wang | G01S 19/47 342/357.31 |
| 8,265,826 B2 * | 9/2012 | Feller | A01B 69/007 701/41 |
| 8,532,899 B1 * | 9/2013 | Loomis | G01C 9/08 340/438 |
| 8,538,462 B2 | 9/2013 | Forstall et al. | |
| 8,825,397 B2 * | 9/2014 | Kasargod | G01S 19/45 340/995.25 |
| 2007/0021912 A1 | 1/2007 | Morita et al. | |
| 2008/0294342 A1 | 11/2008 | Hoshizaki et al. | |
| 2010/0161179 A1 | 6/2010 | McClure et al. | |
| 2012/0116712 A1 | 5/2012 | Hollenstein | |
| 2012/0253656 A1 | 10/2012 | Brandt | |
| 2013/0116921 A1 | 5/2013 | Kasargod et al. | |
| 2014/0046587 A1 | 2/2014 | Rintanen | |

FOREIGN PATENT DOCUMENTS

| | | |
|---|---|---|
| JP | 0772926 A | 3/1995 |
| JP | 07294622 A | 11/1995 |
| JP | 2011107087 A | 6/2011 |
| JP | 2012163509 A | 8/2012 |

OTHER PUBLICATIONS

Bonnifait, et al., "Data Fusion of Four ABS Sensors and GPS for an Enhanced Localization of Car-Like Vehicles," Robotics and Automation, IEEE International Conference, 2001, 6 Pages, IEEE, Retrieved on Aug. 6, 2014.

Scheding, et al., "An Experiment in Autonomous Navigation of an Underground Mining Vehicle," IEEE Transactions on Robotics and Automation, Feb. 1999, pp. 85-95, vol. 15, No. 1, IEEE, Retrieved on Aug. 6, 2014.

Cox, "Blanche-An Experiment in Guidance and Navigation of an Autonomous Robot Vehicle," IEEE Transactions on Robotics and Automation, Apr. 1991, pp. 193-204, vol. 7, No. 2, IEEE, Retrieved on Aug. 6, 2014.

Vicek, et al., "GPS/Dead Reckoning for Vehicle Tracking in the 'Urban Canyon' Environment," Vehicle Navigation and Information Systems Conference, Proceedings of the 1993 IEEE-IEE, Oct. 1993, 2 Pages, IEEE, Retrieved on Aug. 6, 2014.

Fouque, et al., "Enhancement of Global Vehicle Localization Using Navigable Road Maps and Dead-Reckoning," Position Location and Navigation Symposium, 2008, 6 Pages, IEEE, Retrieved on Aug. 6, 2014.

Toledo-Moreo, et al. "Fusing GNSS, Dead-Reckoning, and Enhanced Maps for Road Vehicle Lane-Level Navigation," IEEE Journal of Selected Topics in Signal Processing, Oct. 2009, pp. 798-809, vol. 3, No. 5, IEEE, Retrieved on Aug. 6, 2014.

\* cited by examiner

FACILITATING LOCATION DETERMINATION EMPLOYING VEHICLE MOTION DATA

TECHNICAL FIELD

The subject disclosure relates generally to communication networks, and specifically to facilitating location determination employing vehicle motion data transmitted over communication networks.

DETAILED DESCRIPTION

Figure 1:
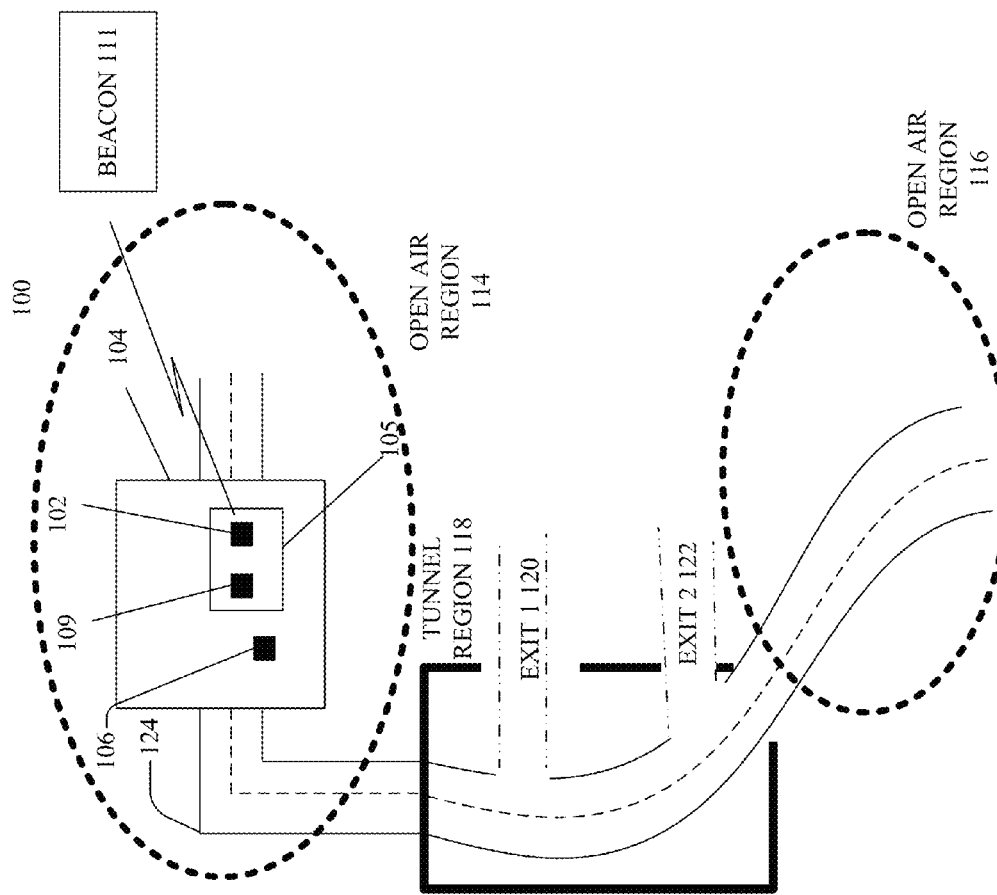
FIG. 1 illustrates an example diagram of a system in which location determination employing vehicle motion data can be facilitated in accordance with one or more embodiments.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "mobile device," "subscriber," "customer," "consumer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

Contemporary location technologies as employed on or for mobile devices tend to be exclusively beacon-based in which mobile devices leverage satellite or terrestrial beacons of known or looked-up location from which to derive location. When a device loses contact with its beacons (e.g., satellites, towers), location request devices that seek to compute location are unable to retrieve current location fixes.

The generation of location information typically takes place by way of network-supported look-ups of actual beacon locations based on beacon identification, directional triangulation amongst beacons of known identity, proximity and/or time-delay approaches. However, all of these technologies require radio or other remote detection of the beacons. Visibility is the key, and when visibility is lost, typically location determination is not possible.

While some devices have algorithms that take a last known location, velocity, and direction vector and allow freewheeling or coasting along a last known path with progressively greater estimation error until new location fixes are received, this temporary approach eventually fails if the beacons remain out of contact.

The embodiments described herein include a location component that can estimate location information for the location component and/or for a location request device that typically relies on beacons to compute location of the location component or the location request device. Transit systems, vehicle manufacturers, mobile device manufactures can benefit by being part of a location-capable ecosystem in areas deprived of location beacons. The determination of location can be based on dead reckoning techniques derived from vehicle data when the location component is coincident with the vehicle from which the vehicle data is obtained. As used herein, the term "dead reckoning" can mean the process of determining a position by using a previously determined location and advancing the previously determined location by known or estimated information indicative of past movement that has transpired over a defined amount of time. Such a solution can effectively estimate location even when the vehicle is underground, in a tunnel, or in another location where contact with a beacon is completely unavailable.

The term, "location information," as referenced herein, can be considered to reference a point in space. The point in space can be specified by information such as latitude/longitude (and, in some embodiments, altitude, as a coordinate in space) information or other information indicative of a point in space. Vehicle data includes information such as speed and turn radius and not including location such as latitude/longitude or altitude. Raw vehicle data of this nature (e.g., speed and direction) is not location or position data, but when combined with a previous location, can be used to calculate a new location in the embodiment described herein.

One or more embodiments described herein can advantageously provide estimates of projected location of a location component or a location request device based on a last known reference location and calculations that use raw vehicle data such as velocity, radius of wheel, steering wheel direction, road tilt, compass direction information or the like. As used herein, the term "wheel" refers to the circular apparatus upon which a vehicle rolls, and may include a frame, flexible tire and/or axle. As used herein, the term "steering wheel" refers to a user input apparatus of a traditional wheeled nature, or joystick, or other control mechanism, where control inputs in the form of rotation or displacement or other inputs are translated to corresponding angular displacements of steerable wheels or other vehicle elements that govern direction of travel. Wheels are one apparatus of supporting a vehicle and gathering data related to movement, but a vehicle that hovers could also be aware of equivalent incremental movement over a surface by way of visual or other sensors.

In various embodiments, direction can be expressed in terms of an absolute global reference system (e.g., North (N), South (S), East (E), West (W) on the globe) or within a localized relative reference system (10 degrees or 0.2 radians to the left of the direction of travel). Position is a type of car-detected data or subway-detected data. For example, a car or subway may have sensors that understand proprietary transportation system beacons or other detectable markers that a smart phone device cannot understand, and the car or subway interpretation of that data, perhaps even being able to arrive at an actual latitude/longitude, could assist the smart phone device. The smart phone device could include the location component and/or be communicatively coupled to the location request device described herein.

In the embodiments described herein, while the quality of the location estimate can degrade over time, constrained travel paths such as those within tunnels, can be leveraged to reject much of the uncertainty in direction, which can result in a fairly accurate speed-based estimate of the traveled distance. The term "speed" as used herein refers to the common definition of rate of movement without direction. The term "velocity," as used herein refers to the common definition of the combination of speed and direction. However, the context will make it evident whether speed information alone or speed and velocity together are implied, and in some discussions redundant directional information may be harmlessly referenced, or unstated directional information may be inferred as needing to be included because of a directional context. This can be very useful for keeping navigation or other location request devices in a useful functioning state for a longer period of time.

Embodiments described herein include systems, methods, apparatus and/or computer-readable storage devices facilitating location determination employing vehicle motion data. In one embodiment, a method includes receiving, by a first device including a processor, first information associated with a vehicle indicative of a position and a direction of the vehicle, wherein the position is measured by the vehicle based on a measured angular rotation rate and radius of a wheel of the vehicle and wherein the direction of the vehicle is measured by the vehicle based on a measured amount of a turn radius of a steering wheel device of the vehicle. As used herein, the term "angular rotation rate" can mean "angular velocity." The method also includes determining, by the first device, a previously determined location of the vehicle; and generating, by the first device, second information about a location of the first device based on the previously determined location of the vehicle and the first information.

In one embodiment, an apparatus includes a processor; and a memory that stores executable instructions that, when executed by the processor, facilitate performance of operations. The operations can include: receiving first information about a device indicative of a position and a direction of the device, wherein the position and the direction are measured by the device based on sensed data from the device; and determining a previously determined location of the device. The operations can also include generating second information about a location of the apparatus based on the previously determined location of the device and the first information.

In another embodiment, a computer-readable storage device is provided. The computer-readable storage device stores executable instructions that, in response to execution, cause a first device comprising a processor to perform operations. The operations can include: receiving first information associated with a second device indicative of a position and a direction of the second device, wherein the position is measured by the second device based on a measured angular rotation rate and radius of a wheel of the second device and wherein the direction of the second device is measured by the second device based on a measured amount of a turn radius of a steering wheel device of the second device. The operations can also include identifying previously determined position and direction information for the second device; and generating second information about the first device based on the previously determined position and direction information for the second device and the first information.

FIG. 1 illustrates an example diagram of a system in which location determination employing vehicle motion data can be facilitated in accordance with one or more embodiments. In various embodiments, system 100 can facilitate location determination in the presence or absence of beacon-based information. For example, in some embodiments, notwithstanding beacon-based information is unavailable, system 100 can facilitate generation of location information for location component 102 collocated with car 104 or for location request device 109 communicatively coupled to location component 102. When beacon-based information is unavailable, the location can be determined based on raw vehicle data for car 104 in which location component 102 is located.

As shown, system 100 includes location component 102, car 104 and car data component 106. Location component 102 can be any number of different types of devices (e.g., smart phone, laptop, handheld device) that can employ primitive data sensed/measured/obtained about car 104 to generate, augment and/or replace location information lost or unavailable due to non-availability of beacons (e.g., beacon 111). In embodiments, location component 102 can be electrically and/or communicatively coupled to location request device 109, car 104 and/or car data component 106 to facilitate the performance of one or more location determination functions of system 100.

Car 104 can be any number of different types of vehicles (e.g., conventional vehicle, connected car) and can travel within an open air region 114, 116 and/or tunnel region 118. Car 104 includes car data component 106, which can sense, measure, generate, collect, process information about one or more aspects of car 104. The sensed, measured, generated, collected and/or processed information can be received by location component 102 in some embodiments.

In some embodiments, location component 102 can be located within a device 105 (e.g., smart phone), and a location request device 109 (which can be electrically or communicatively coupled to location component 102, can be included in system 100. In various embodiments, location request device 109 can include hardware that includes a processor and circuitry configured to provide navigation-based services, or include software-based applications such as software-based navigation applications.

Location component 102 can be or be included in a device 105 (e.g., smart phone) with global positioning system (GPS) capability. In some embodiments, location component 102 is electrically and/or communicatively coupled to location request device 109. Device 105 and location component 102 are physically collocated with car 104. In any embodiment described herein, the functions of car 104, car data component 106 and/or location component 102 can be distributed different locations of within a network and/or be electrically coupled to one another.

The location component 102 can serve location request device 109 by providing location information for the location component 102 in cases in which location request device 109 is unable to deduce location due to unavailability of a beacon. In various embodiments, a global positioning system (GPS) and/or location request device 109 desiring location can be located in car 104, car data component 106, and/or location component 102.

Depending on the allocation of functionality, car 104, car data component 106 and/or location component 102 can subsequently pass refined location estimates to each other. A goal of one or more of the embodiments described herein is for a beacon-reliant location element to gather unique vehicle raw data to support better location estimates when out of coverage of beacon 111. The main role of car 104 in the architecture/embodiments described herein is to provide supportive raw vehicle data about car 104 to location component 102 to assist location component 102 in efforts to refine a location estimate when out of coverage of beacon 111. Any of car 104, car data component 106, and/or location component 102 could also have cellular network coverage (e.g., to microcells in a tunnel) and, in other embodiments, further sharing of raw vehicle data, or a derived location, over a network can be performed.

In some embodiments, the information utilized by location component 102 to compute location estimates is raw vehicle data about car 104. Car data component 106 is the source of the raw vehicle data measured or sensed or otherwise obtained by location component 102 from car 104.

In various embodiments, the information sensed and/or measured by car 104 or car data component 106 can include, but is not limited to, information for computation of position, velocity, and/or acceleration on any axis, compass heading, wheel radius and/or wheel direction angle information about car 104. For example, angular rotation rate of a wheel of known radius of car 104 and compass angle, along with speed, can be employed to perform computations for identifying the location of car 104.

In one example, compass information or a measurement of the turn radius of the steering wheel of car 104 can be transmitted by car 104 and/or car data component 106 to location component 102 and employed to compute direction. By way of another example, but not limitation, the combined angular rotation rate of the wheel and known wheel radius of car 104 can be obtained by location component 102 and employed to compute speed. By way of yet another example, but not limitation, the tilt of a roadway on which car 104 is located and/or the tilt of car 104 can be transmitted to location component 102 and employed to compute orientation of car 104.

Because location component 102 is collocated with car 104, location component 102 can travel to open air regions (e.g., open air regions 114, 116) or tunnel regions 118 at different points in time. When location component 102 is within a tunnel region, beacon 111 may be inaccessible to location request device 109, which can be collocated with location component 102 and/or which can be collocated with car 104 and/or car data component 106 in various different embodiments.

Tunnel region 118 can include any number of different types of regions including, but not limited to, a tunnel, an underground area or, in some embodiments, any area from which beacon 111 is not available. For example, device 105 can include location component 102 and can be in an area in which beacon 111 is blocked or the strength of beacon 111 is significantly reduced due to interference or the like. In open air regions 114 or 116, location component 102 can deduce the location of location component 102 due to visibility of beacons (e.g., beacon 111). In tunnel region 118, however, location component 102 and/or location request device 109 is unable to access and/or transmit beacon-based location information.

In yet another case, location component 102 can compute location information based on the measured and/or sensed data about car 104 collected and/or determined by car data component 106. For example, location information can be determined by location component 102 for the location component 102 and/or for the location of location request device 109 based on current and/or previously determined location information for either location component 102 or, in some embodiments, for car 104, and the time interval that has passed since the previous information was received or determined.

For example, the location calculation computed by location component 102 can utilize the last known location of location component 102 (presumably this is where the GPS hardware itself is, or the location component 102 can utilize GPS hardware data that originates from any nearby hardware of known distance). Thus, when the last known location is coupled with raw vehicle data about the operation/motion/orientation of car 104 in which location component 102 is located, location component 102 can determine a new location for location component 102. In some embodiments, location component 102 can then deduce the location of car 104 because car 104 is known to be within some communicative range of location component 104. For example, in some embodiments, car data component 106 and location component 102 can communicate over a BLUETOOTH® short-range signal and as such is within a limited distance of one another.

In any case, in various embodiments, location component 102 can estimate location of location component 102 (and therefore also deduce location of collocated car 104) without the availability of beacon 111 when location component 102 and car 104 are in tunnel region 118. In some embodiments, location component 102 (or device 105, which includes the location component 102) can directly employ or transmit the estimated location information to car 104 and/or car data component 106 in some embodiments. However, typically, if location component 102 is or is included as part of a handheld device, location component 102 is the main component benefitting from higher quality location information in tunnel region 118.

When location information is determined by location component 102 and provided to location request device 109, location request device 109 can employ such information to perform other operations including, but not limited to, transmitting information for navigation of car 104. For example, if location component 102 is in car 104 as part of a vehicular navigation system, which in turn might be part of car 104 or car data component 106, then location component 102 can share the estimated location with car 104 or car data component 106. However, in general, location component 102, whether the location component 102 is located within or is part of a handheld device or resident in a map system of car 104, can receive raw vehicle data that enhances the ability of location component 102 to predict location. The location information can be shared with other functions in location component 102, or back to car 104 or car data component 106, but the additional processing that may be performed by car 104 and/or car data component 106 is secondary to the primary functionality of location component 102 predicting location. In various embodiments, one or more of car 104, car data component 106 and/or location component 102 can take appropriate actions with the improved location computed by location component 102 including, but not limited to, outputting a message from car 104 to advise the driver or car 104 to take a particular exit from tunnel region 118, or advancing the navigation safety system to higher alert to a potential traffic hazard.

In these embodiments, location component 102 can directly employ or transmit information as detailed as upcoming exits (e.g., exit 1 120 is upcoming in x number of miles, exit 2 122 is upcoming in 1.3 miles or the like), geographical position (e.g., longitude and latitude information, altitude, street and city information, nearby businesses of interest or the like) based on the location information determined by location component 102 notwithstanding beacon-based information may be unavailable.

Figure 2:
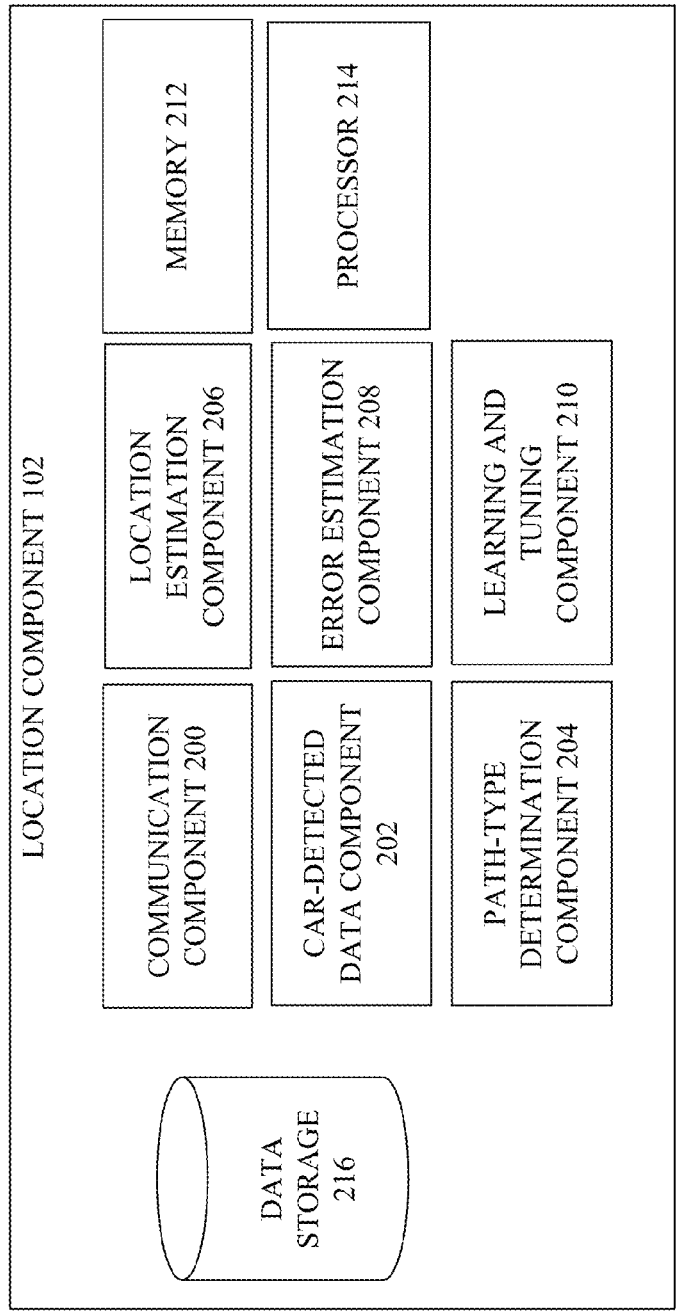
FIG. 2 illustrates an example block diagram of the location component of the system of FIG. 1 for facilitating location determination employing vehicle motion data in accordance with one or more embodiments described herein.

An example of the structure and/or functionality of location component 102 will be described in greater detail with reference to FIG. 2. FIG. 2 illustrates an example block diagram of the location component of the system of FIG. 1 for facilitating location determination employing vehicle motion data in accordance with one or more embodiments described herein.

Location component 102 can include communication component 200, car-detected data component 202, path-type determination component 204, location estimation component 206, error estimation component 208, learning and tuning component 210, memory 212, processor 214 and/or data storage 216. In various embodiments, one or more of communication component 200, car-detected data component 202, path-type determination component 204, location estimation component 206, error estimation component 208, learning and tuning component 210, memory 212, processor 214 and/or data storage 216 can be electrically and/or communicatively coupled to one another to perform one or more functions of location component 102. Repetitive description of like elements employed in other embodiments described herein is omitted for sake of brevity.

Communication component 200 can include hardware, software and/or a combination of hardware and software configured to transmit and/or receive information from location request device 109, beacon 111, device 105, car 104, and/or car data component 106. For example, in various embodiments, communication component 200 can receive any of a number of different types of information including, but not limited to, absolute or relative sensed or measured data about car 104 (e.g., turn radius of a steering wheel of car 104, angular rotation rate of wheel of car 104). Communication component 200 can transmit location information for location component 102 or location request device 109. In other embodiments, any number of exchanges of data can be performed such that fully calculated location information is provided to car 104 in exchange for information sensed about car 104.

Car-detected data component 202 can detect and process position as derived from a proprietary beacon or location system not natively receivable by location component 102, and/or other information including, but not limited to, velocity, interval, time, arc, compass or direction angle information received about car 104. For example, car-detected data component 202 can receive different types of information in different formats (e.g., angular rotation rate and wheel radius expressed as miles per hour or kilometers per hour, compass direction information indicated as "North" or "South," or as a degree measurement relative to a reference value) and convert the information to a format that can be employed with other measurements to generate location information.

Path-type determination component 204 can determine whether the path on which location component 102 is traveling is constrained or unconstrained. For example, in one embodiment, path-type determination component 204 can generate a signal indicating that location component 102 is on a constrained path if a determination is made or information is received indicating that location component 102 is in a tunnel region (e.g., with reference to FIG. 1, tunnel region 118). Path-type determination component 204 can also deduce that car 104 is on a constrained path in these cases since location component 102 is collocated with car 104 or within a short distance of car 104 such that car 104 (or car data component 106 at car 104) can communicate with location component 102 over a short-range communication channel.

Location estimation component 206 can generate the estimated location information for location component 102 and/or location request device 109. By way of example, but not limitation, the location information can include relative or absolute position and/or relative or absolute direction. Absolute position/direction can be indicated in any number of different formats including, but not limited to, longitude and latitude, city/street, northwest, southeast, west. Relative position can be indicated in any number of formats provided relative to an absolute location known to car 104 and/or provided to device from location estimation component 206 (e.g., 3 miles on a known route from the desired destination A, 0.25 miles from exit 1 of tunnel region 118, 1 mile at a direction of 45 degrees west of north of the reference point A).

Figure 3:
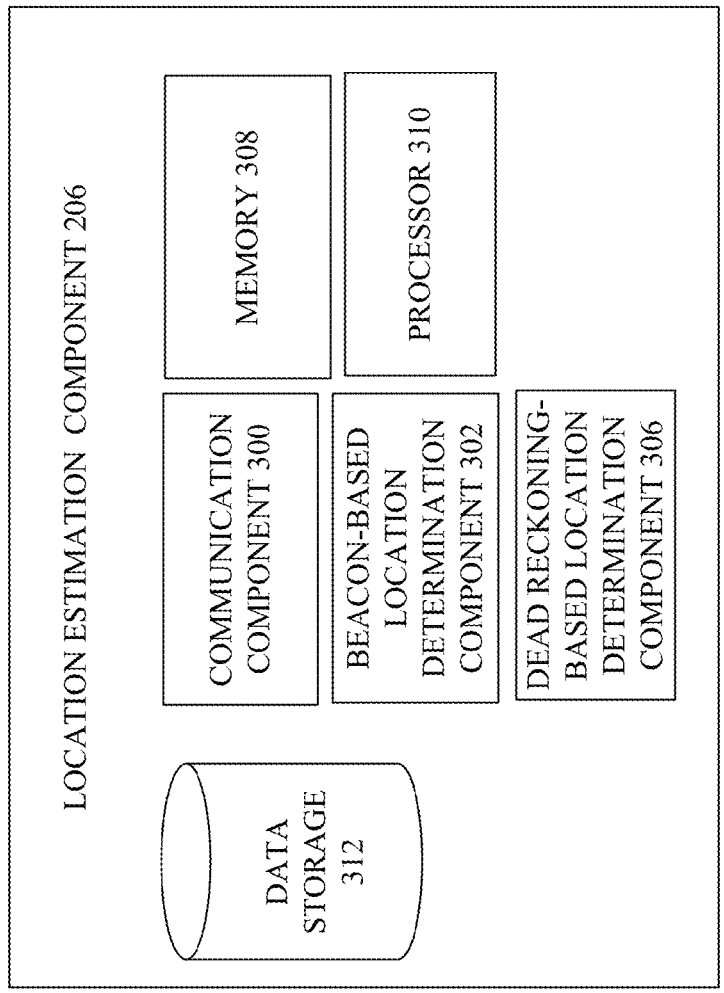
FIG. 3 illustrates an example block diagram of the location estimation component of the location component of FIG. 1 in accordance with one or more embodiments described herein.

The structure and/or function of location estimation component 206 will be described in greater detail with reference to FIGS. 3-10. Turning first to FIG. 3, illustrated is an example block diagram of the location estimation component of FIG. 1 in accordance with one or more embodiments. Repetitive description of like elements employed in other embodiments described herein is omitted for sake of brevity.

In one embodiment, location estimation component 206 can include communication component 300, beacon-based location determination component 302, dead reckoning-based component 306, memory 308, processor 310 and/or data storage 312. In various embodiments, one or more of communication component 300, dead reckoning-based location component 302, beacon-based location determination component 302, memory 308, processor 310 and/or data storage 312 can be electrically and/or communicatively coupled to one another to perform one or more functions of location estimation component 206.

With reference to FIGS. 1 and 3, communication component 300 can receive information indicative of beacon-based location for location component 102 and/or position, velocity and/or direction about car 104. Communication component 300 can transmit location information estimated by location estimation component 206 to location request device 109 and/or, in some embodiments, to car data component 106 or car 104. Essentially, once a refined location is estimated, the refined location estimate can be transmitted to any location, device or location request device.

The refined location estimate is typically transmitted to a location request device (e.g., location request device 109) executing in or near location component 102 but car 104 could receive the refined location as well. Car 104 is not an essential recipient of the location estimate and receipt by car 104 is merely optional and need not be provided in any embodiments. In some embodiments, the resultant refined location can be transmitted to a microcell cellular network device within or associated with a tunnel and/or a remote server that might be reachable even if satellites are not visible.

Beacon-based location determination component 302 can determine whether beacon-based location information is received and/or available at location component 102. For example, in embodiments in which location component 102 seeks to estimate the location of location component 102, location request device 109 or location of collocated car 104, beacon-based location determination component 302 can receive beacon-based location information and calculate location for location component 102.

Dead reckoning-based location determination component 306 can determine location information for location component 102 in cases when beacon-based location information is not available (or when beacon-based location information is available and location component 102 is determining tuning bias of sensors of car 104, which will be discussed in more detail with reference to FIGS. 2 and 11).

Memory 308 can store computer-executable instructions that can be executed by processor 310. For example, memory 308 can store instructions for determining whether beacon-based location information is available, determining error estimates for location information generated. Processor 310 can process computer-readable storage medium computer-executable instructions to perform one or more of the functions described herein with reference to location estimation component 206.

Data storage 312 can store information indicative of error estimate information, position, direction and/or velocity data received from car 104, beacon-based location information and/or the like.

Figure 4:
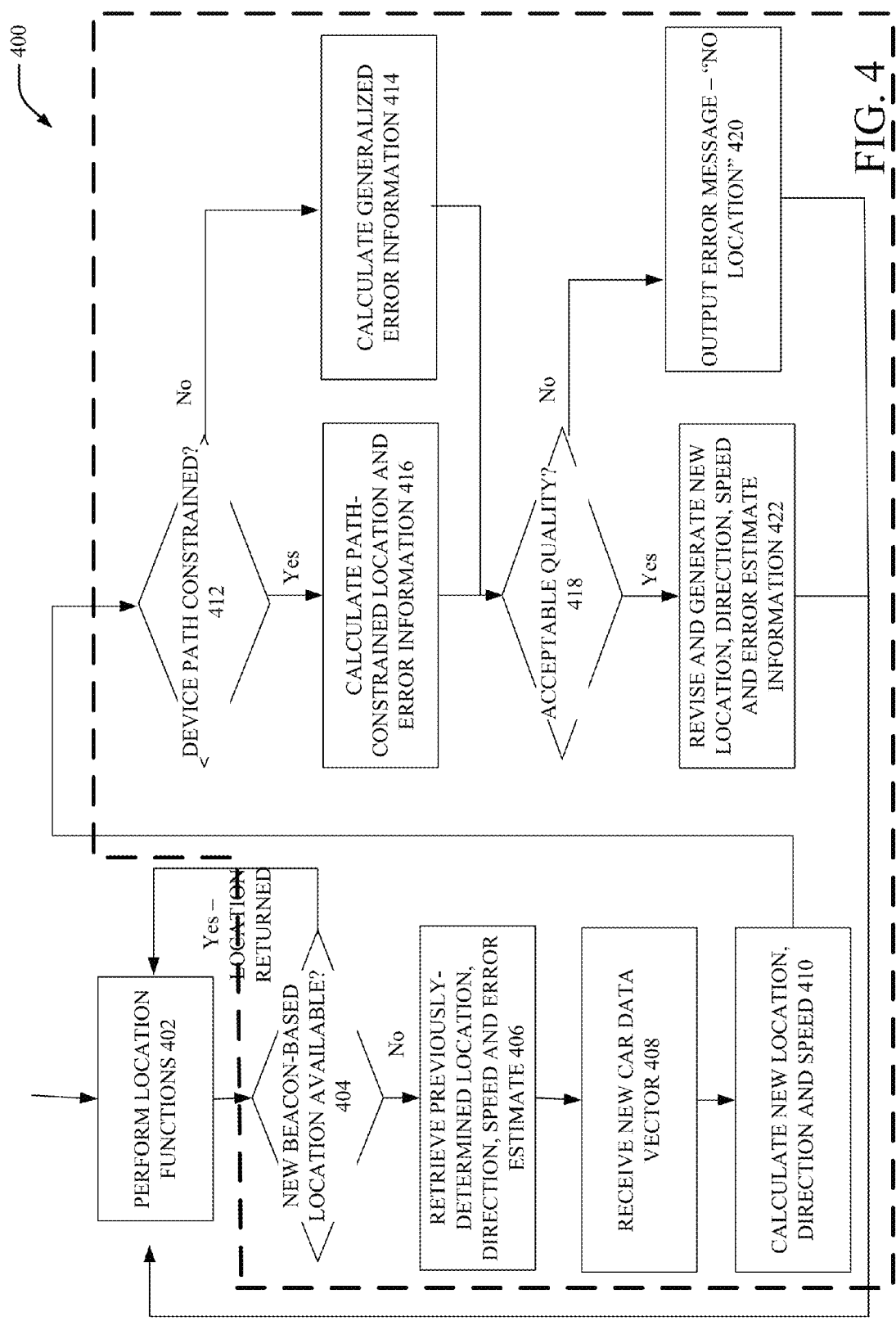
FIG. 4 illustrates an example block diagram of a method of performing location determination by the location component of FIG. 1 for facilitating location determination employing vehicle motion data in accordance with one or more embodiments described herein.

The functionality of dead reckoning-based location determination component 306 will be described in greater detail with reference to FIGS. 4-10. Turning first to FIG. 4, illustrated is an example block diagram of a method of performing location determination by the location component of FIG. 1 for facilitating location determination employing vehicle motion data in accordance with one or more embodiments described herein. A goal of one or more of the embodiments described herein is for a beacon-reliant location element to gather unique vehicle raw data to support better location estimates when out of coverage of a beacon. As such, one goal of the embodiments described herein is to improve upon the "perform location functions" step of 402, which requests that a current location for location component 102 (or location request device 109) be obtained, returning useful information more often as opposed to a "no location available" error shown at step 420.

At 402, the method 400 includes location estimation component 206 of location component 102 performing one or more functions related to determination of location. Communication component 300 of location estimation component 206 can also request an update of raw vehicle data from car 104 from time to time. The location update request can be transmitted at defined intervals (e.g., every 10 seconds, every 0.1 second) and/or independently originated by car 104 based on occurrence of one or more events (e.g., significant change in parameters of car 104). The data update request can request information from car 104 regarding information measured/sensed or obtained by, or independently originated by, car data component 106. Such updated data can be employed by location estimation component 206 to estimate new location information for location component 102, location request device 109 and/or, in some embodiments, the collocated car 104.

At step 404, a determination is made as to whether a beacon is available to location component 102 (and therefore, beacon-based location is available). If beacon-based location information is available at location estimation component 206, then the new beacon-based location information is incorporated into the processing for beacon-based location determination component 302 to determine a new location for location component 102. Location request devices (e.g., location request device 109) can infer that the resulting location is also the location of location request device 109 and/or car 104 because they are collocated by way of short-range communication.

If new beacon-based location information is not available, one or more steps are performed by dead reckoning-based location determination component 306. For example, at 406, the previously determined or otherwise most recent information (e.g., position and/or velocity) known by location component 102 are retrieved. As shown in FIG. 4, in some embodiments, location, direction, speed and/or error estimates can be retrieved by location component 102. In some embodiments, the previously determined and/or the most recent error estimate for the estimated location information generated by location component 102 is also retrieved. In one embodiment, the previously determined and/or the most recent error estimate can be retrieved from a data storage (e.g., data storage 216). By way of example, but not limitation, with reference to FIG. 12, historical velocity, turn radius and/or location information 1204, including previously generated location information, can be retrieved.

At 408, the new position, velocity and/or direction raw vehicle data about car 104 is received and processed by location component 102. For example, the position, velocity, radius of the wheel and/or direction information can be sensed or measured information. As another example, the angular rotation rate of a wheel of car 104 can be considered velocity information. As yet another example, directional information from a compass at car 104, or turn radius information from the steering wheel of car 104, can be considered direction information. Step 408 represents the retrieval by the logic of FIG. 4 of a baseline location vector on which dead reckoning is performed.

At 410, dead reckoning-based location determination component 306 calculates a new position, velocity and/or direction for location component 102 (and optionally, about car 104) based on the raw vehicle data about car 104 and previously determined information. For example, dead reckoning-based location determination component 306 can project where car 104 will be in the future based on new measured information about car 104 and where car 104 was previously located. In some embodiments, dead reckoning-based location determination component 306 can also factor into the computation of location information, information indicative of whether location component 102 (or car 104) is traveling on a constrained path or an unconstrained path as described in further detail below.

Figure 6:
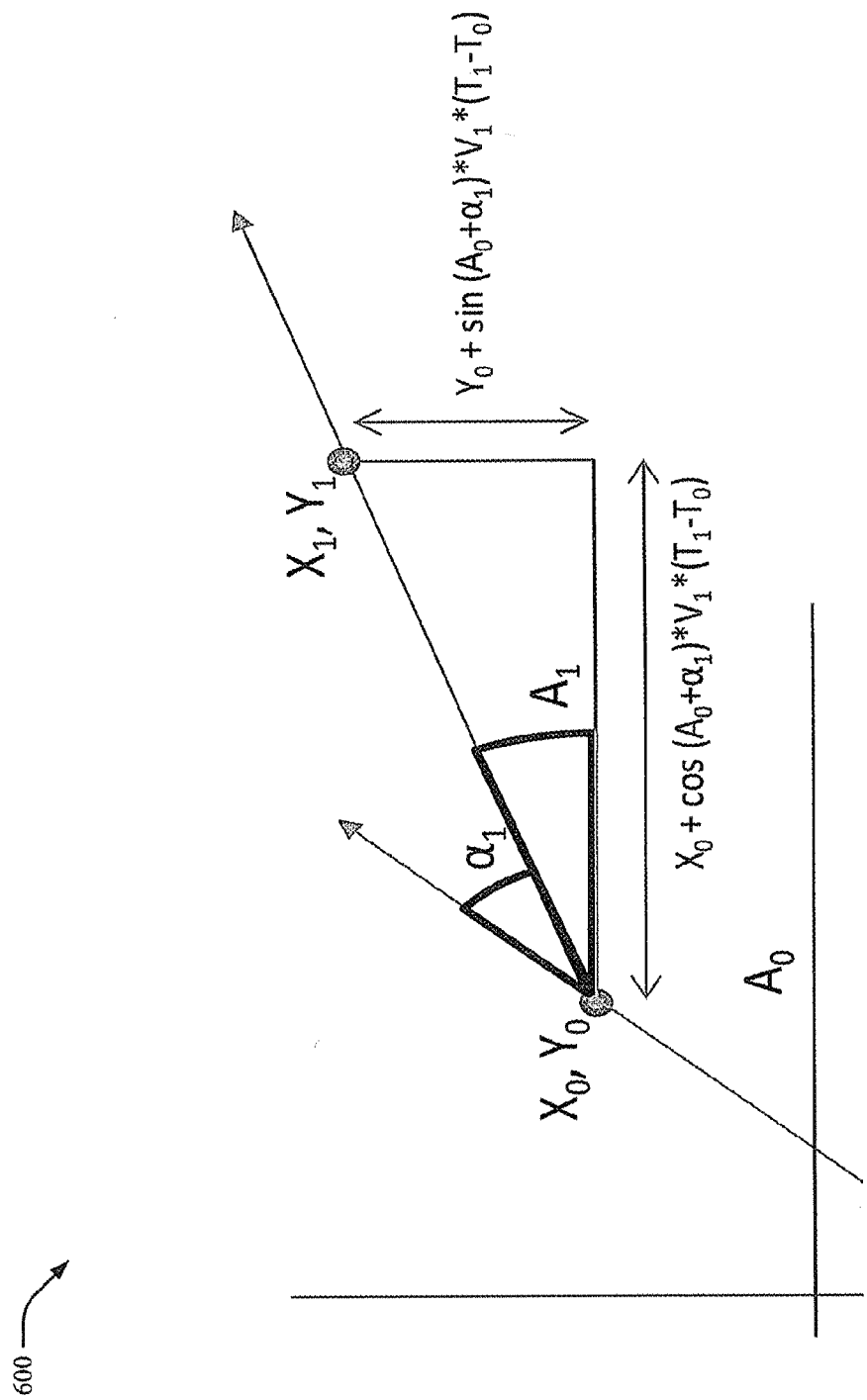
FIG. 6 illustrates a graph for determining error-free linear location information estimate within the dead reckoning-based location determination component of the location component of FIG. 1 for facilitating location determination employing vehicle motion data in accordance with one or more embodiments described herein.
Figure 7:
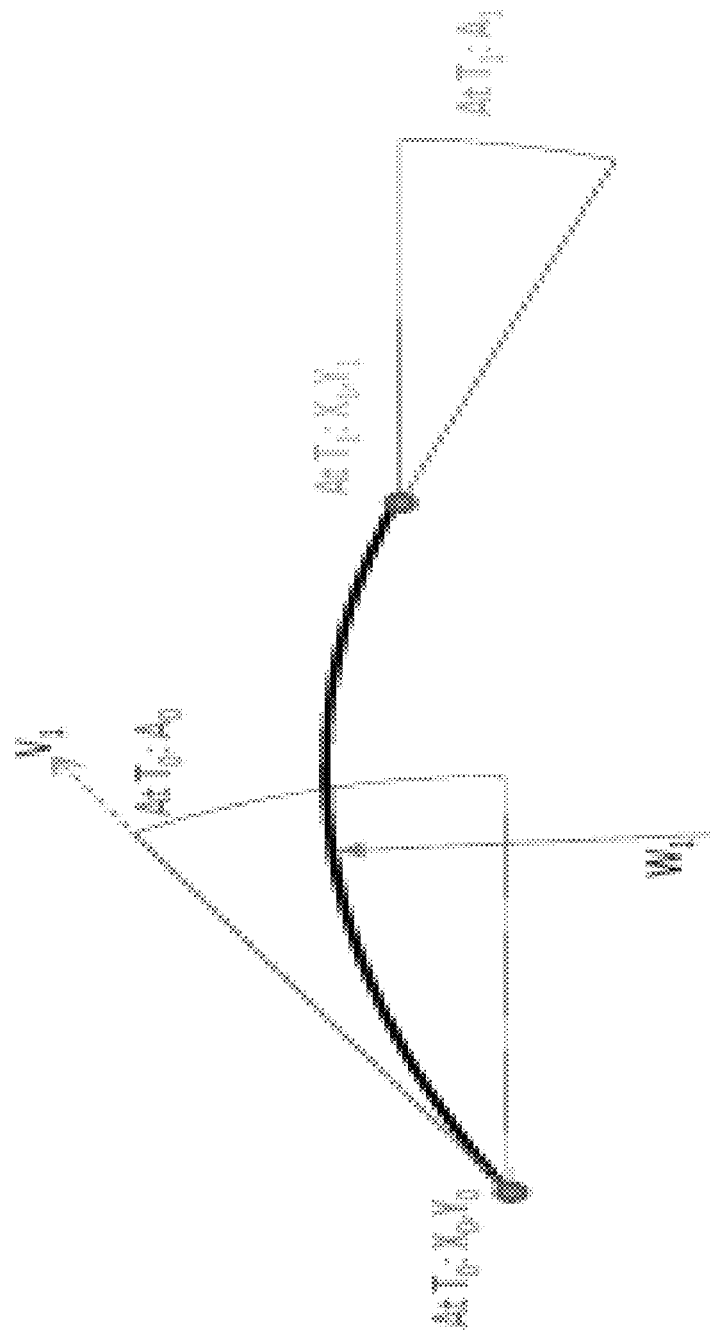
FIG. 7 illustrates an example block diagram of a graph detailing arc-based computation within the dead reckoning-based location determination component of the location component of FIG. 1 for facilitating location determination employing vehicle motion data in accordance with one or more embodiments described herein.
Figure 8:
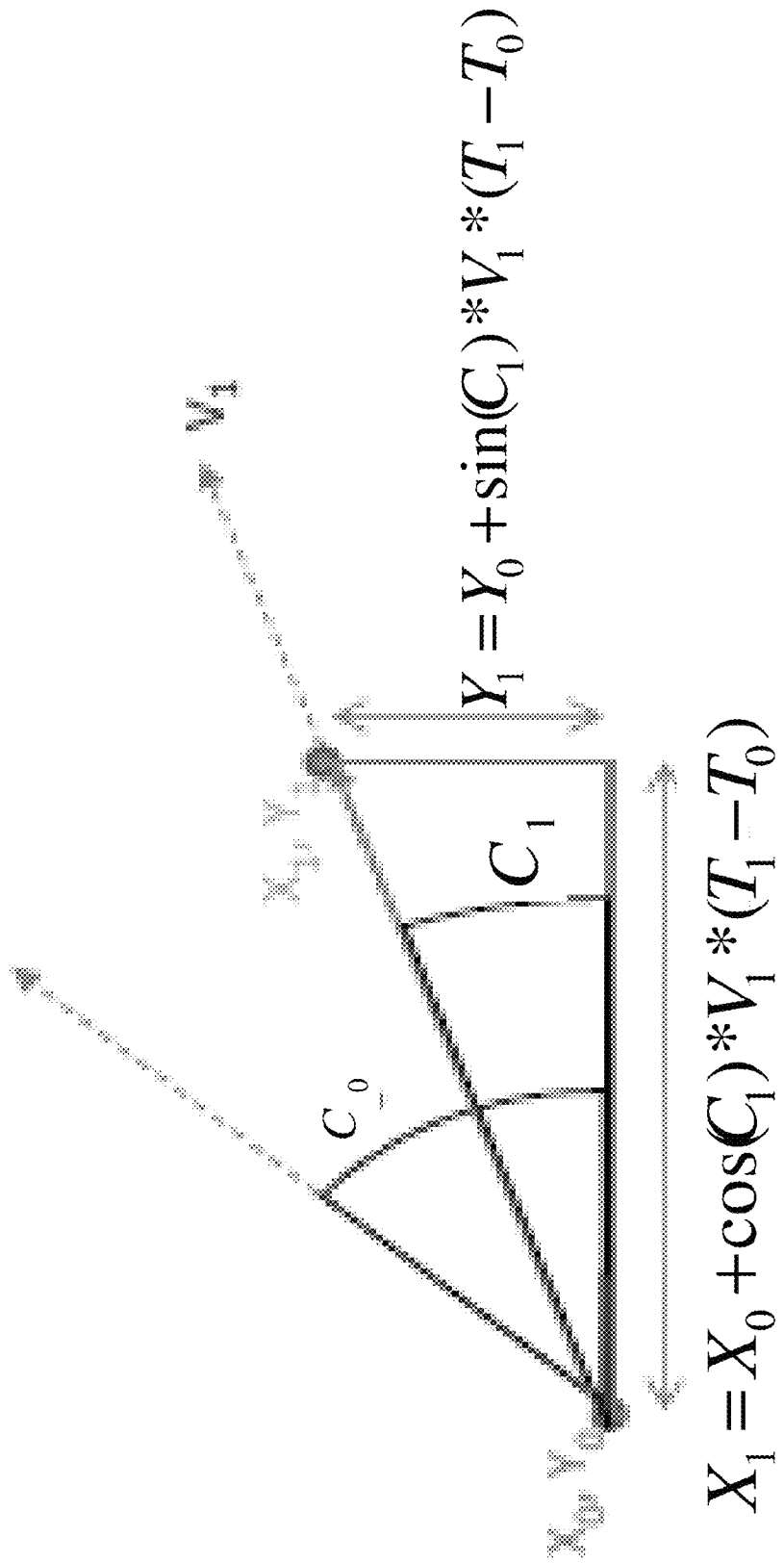
FIG. 8 illustrates an example block diagram of a graph detailing compass-based computation within the dead reckoning-based location determination component of the location component of FIG. 1 for facilitating location determination employing vehicle motion data in accordance with one or more embodiments described herein.

In some embodiments, dead reckoning-based location determination component 306 can calculate a new position, velocity and/or direction as described with reference to FIGS. 6, 7 and 8. FIG. 6 illustrates a graph for determining an error-free linear location information estimate within the dead reckoning-based location determination component of the location component of FIG. 1 for facilitating location determination employing vehicle motion data in accordance with one or more embodiments described herein. FIG. 7 illustrates an example block diagram of a graph detailing arc-based computation within the dead reckoning-based location determination component of the location component of FIG. 1 for facilitating location determination employing vehicle motion data in accordance with one or more embodiments described herein. FIG. 8 illustrates an example block diagram of a graph detailing compass-based computation within the dead reckoning-based location determination component of FIG. 1 for facilitating location determination employing vehicle motion data in accordance with one or more embodiments described herein.

As described, FIG. 6 starts with a direction, amends the direction, and projects a new location. FIG. 7 employs an arc-based projection for determination of location information by dead reckoning-based location determination component 306. FIG. 8 is a special case of FIG. 6 where absolute compass direction is available to dead reckoning-based location determination component as part of the raw vehicle data collected about car 104.

The challenge with FIG. 6 is the difficulty for car data component 106 to gather information that measures change in direction of car 104. The use of arc to estimate a linear approximation of direction and hence location is less accurate than direct calculation of position from an arc of travel. The use of accelerometers could be another approach to estimate net rotation of car 104. An internal car calculation using before/after compass headings to arrive at a net direction and overlaps conceptually with the absolute compass reading of FIG. 8.

Turning to FIG. 6, a variable, T, represents time interval of travel of car 104 and a variable, V, represents velocity of car 104. A variable, α, represents the rotation of car 104 from one direction to another. Dead reckoning-based location determination component 306 of location component 102 can infer the location of location component 102 from the raw vehicle data provided by car 104 in this embodiment.

As shown, sample data vector at time $T_1$ includes: the time start to time stop interval, $T_0$ to $T_1$, of car 104; average velocity of car 104, $V_1$, over the $T_1$ interval; and/or change in direction (angle), $α_1$, for car 104 over the interval, $T_1$. Note that as in any stepwise estimation, while data is described here in terms of values at the end of the reporting interval, actual data may reflect initial, interim, averaged, or other expressions of data as gathered and reported by car data component 106 during the reporting interval. In various embodiments, averages of position, velocity and/or direction can be computed by car 104 (or car data component 106) before car 104 (or car data component 106) reports raw vehicle data to location component 102. The absolute direction angle is A, and the delta angle α is calculated from the turn radius of the steering wheel of car 104 based on car accelerometer data, based on net change in compass heading, or other measurement/sensor devices.

In one embodiment, dead reckoning-based location determination component 306 can receive a set of information or vector of raw vehicle data from car 104. The set of information or vector of raw vehicle data can include, but is not limited to, time interval of travel by car 104, average or instantaneous (at time of measurement) velocity over interval of travel by car 104 and/or direction over interval of travel by car 104. In various embodiments, car 104 can employ any number of intervals as determined by car 104 and/or as determined by sensors and/or measurement devices of car 104, as programmed by or based on intervals over which dead reckoning-based location determination component 306 can receive a set of information or data vector or the like.

In some embodiments, an interval start time can be designated, $T_0$, while an interval stop time can be designated $T_1$. In some embodiments, a single value $T_1$ can be employed and dead reckoning-based location determination component 306 can employ an assumption about the previous interval start time. In some embodiments, one or more of the start and/or stop times can be implied by the time of the last/current reports received by dead reckoning-based location determination component 306.

Velocity, $V_1$, over the interval can also be provided. In one embodiment, the velocity can be a single measurement taken at one point in time. In another embodiment, the velocity can be an average of any number of velocity measurements.

Car 104 only sends vehicle sensor data which, at a minimum is speed and direction. For simplicity, the equations here and in FIG. 6 refer to $V_x$, which suggests a velocity inclusive of a direction, but in some embodiments, V can be interpreted as speed because the rest of the context includes explicit direction. The car 104 can transmit to location estimation component 206 updates in measured/sensed information for car 104. For example, in some embodiments, car 104 can transmit an initial data vector for time $T_0$, consisting of an initial time, speed, and direction angle $T_0, V_0, A_0$.

Based on the initial location vector received and the updates (e.g., $T_1, V_1, A_1$), dead reckoning-based location determination component 306 can calculate travel of car 104 starting from the location determination component's knowledge of the initial location vector information (e.g., position, velocity, initial absolute direction angle), applying the updates from the new data vector, and projecting to a new location vector.

In some embodiments, the allocation of calculations between devices is flexible. In one embodiment, using fine resolution internal data (e.g., measured or sensed data about car 104) pre-calculated averaged readings can be provided to location estimation component 206 by car 104 (or car data component 106). In other embodiments, some or all raw vehicle data readings can be provided to location estimation component 206 for calculation of location information for location component 102 (or location request 109).

As shown, the generation of new location information can be based on linear interpolation. For example, the device moves forward for a certain amount of time in a particular direction. The new estimated location vector 1 at time $T_1$, or $X_1, Y_1, V_1, A_1$, can be computed as shown in Equations 1-4:

$$X_1 = X_0 + \cos(A_0 + α_1) * V_1 * (T_1 - T_0) \quad \text{(Equation 1)}$$

$$Y_1 = Y_0 + \sin(A_0 + α_1) * V_1 * (T_1 - T_0) \quad \text{(Equation 2)}$$

$$V_1 = V_0 \quad \text{(Equation 3)}$$

$$A_1 = A_0 + α_1 \quad \text{(Equation 4)}$$

While the incorporation of tilt of car 104 or pathway on which car 104 rides on, compass data, and error estimates are left out for brevity, such variables can also be included in the calculation. For example, in one embodiment, the calculation of direction change as a function of road tilt can be performed. To make such calculation, the direction change can be expressed in a number of different ways.

In one embodiment, direction change can be expressed as an adjustment to angle, A, in any of the calculations described herein. For example, $α'_1$ can be the additional angle adjustment to the direction of travel $A_0$ related to tilt, and can be a function of speed and tilt. The physics of elastic tires, imperfect friction, etc. mean that a vehicle can drift in the direction that a road is laterally tilted with respect to the direction of travel, resulting in additional changes in direction as compared to a laterally level road. The speed of the vehicle may introduce further adjustments. This equation could be defined as a static set of operations or allowed to refine its dynamics based on learned data. In the larger calculation of position $X_1$, $Y_1$ from $X_0, Y_0$ based on angle $A_0$, the equation $A_0 + α_1 + α'_1$ can be employed as the angle. Similarly, the net contribution of tilt could also be expressed as an adjustment to the turn radius, W.

Tilt can be a significant factor in determining location since, from a physics standpoint, tilt can have an effect on both the direction of a vehicle and the sideways positional drift of a vehicle in comparison to what would happen on a level road surface. The amount by which tilt can affect the calculation of location can depend on different factors including, but not limited to, the physics of the car, tires, and other factors. For example, a railed vehicle may not be affected by tilt at all. Like any of the sensed/measured values that a vehicle can collect, they contribute in varying degrees to the calculated location estimate. In some embodiments, a combination of inputs can be chosen that has significance in the calculation (e.g., potential value in increasing the accuracy of the estimation), tolerable error that does not worsen location calculations, and/or acceptable complexity.

FIG. 7 illustrates an example block diagram of a graph detailing arc-based computation within the dead reckoning-based location determination component of the location component of FIG. 1 for facilitating location determination employing vehicle motion data in accordance with one or more embodiments described herein. In some embodiments, an arc-based projection can be determined. For example, instead of or in addition to the car data vector $(T_1, V_1, A_1)$, a simplified data vector $(T_1, V_1, W_1)$ can be reported about the operations of car 104 for a defined interval, $T_1$. The traveling velocity of car 104 can be calculated by location component 102 at velocity $V_1$, along the arc of turn radius, $W_1$, over time interval, $T_1$, to arrive at new location and direction $(X_1, Y_1, V_1, A_1)$. Knowing an initial location vector $(X_0, Y_0, V_0, A_0)$ and direction of travel, an arc of radius, $W_1$, can be positioned with one end at the initial location $X_0$, $Y_0$ and with initial direction of travel in the same direction as $A_0$, The resulting estimated location at $X_1$, $Y_1$ is at the endpoint of the arc defined by its path length which is equal to $V_1*(T_1-T_0)$.

The turn radius is associated with the amount by which the actual steering wheel of car 104 is turned. The turn radius results in the arc, of radius, $W_1$, that is shown in the diagram. The turn radius of the steering wheel device of car 104, $W_1$, can be provided by car 104 (or car data component 106). In some embodiments, the turn radius is derivable from steering wheel rotation angle $\gamma_1$ or actual measured tire angle $\beta_1$. From the steering wheel rotation angle $\gamma_1$ or measured tire angle $\beta_1$, the turn radius, $W_1$, can be arrived at immediately prior to reporting by car 104 (or reporting by car data component 106) or by calculations at location component 102 using lookup tables, functions, or other information that capture the electrical and/or mechanical conversion of steering wheel displacement to angular displacement of wheels. For example, $W_1$=table_lookup_of($\gamma_1$) or $W_1$=mathematical_function_of ($\gamma_1$). The variable $\gamma_1$ is a primary argument of these calculations but, in some embodiments, the calculations are not exclusive of other inputs such as wheel radius, speed of travel, and other variables that could affect or be applied to refine the calculation of $W_1$. As with the velocity, the measurements can be a single measurement or an average of a number of measurements.

FIG. 8 illustrates an example block diagram of a graph detailing compass-based computation within the dead reckoning-based location determination component of the location component of FIG. 1 for facilitating location determination employing vehicle motion data in accordance with one or more embodiments described herein. In an alternative embodiment, a vector including raw vehicle data about car 104 can include time interval, velocity over interval, and/or compass heading. The time interval $T_0$ to $T_1$ and velocity $V_1$ can be the same as described with reference to the embodiment of FIG. 7. However, a precise and accurate compass heading, $C_1$, can also be employed in this embodiment. The compass heading can be a globally absolute direction.

In the embodiment shown, an initial device location vector $(X_0, Y_0)$ can be known by location estimation component 206. The information for angle $A_0$ is not needed in this embodiment given the absolute nature of compass heading, $C_1$. The simplified data vector $(T_1, V_1, C_1)$ can be reported by car 104 over a defined interval, and received at location estimation component 206. Dead reckoning-based location determination component 306 can calculate the traveling velocity of car 104, $V_1$, along the new reported direction $C_1$ until $T_1$ to arrive at new location and direction $(X_1, Y_1)$. In some embodiments, $C_1$, as illustrated is a representation of the compass heading.

In one embodiment, a hybrid formula can be employed in which the angle $\gamma$ of the wheels can be blended with the absolute angle A of the direction of travel. For example, $Y_1$ can be equal to $Y_0+\sin(A_0+\gamma_1)*V_1*(T_1-T_0)$. However, in this embodiment, $A_0$ is the absolute direction of car 104 in space. The delta angle $\gamma_1$ applied to $A_0$ can be employed in embodiments in which the location information is sampled at a sufficiently fine grain so as to be approximately linear. The delta angle $\gamma_1$ can be based on steering wheel rotation and could be considered a linear additive adjustment to $A_0$ in embodiments in which the steering wheel rotation combined with elapsed time is small. If either variable (delta angle or elapsed time) gets large, then car 104 begins to arc and linear projections become less and less accurate. In various embodiments, the arc-based projection described with reference to FIG. 7 can be employed to address this issue.

Figure 10:
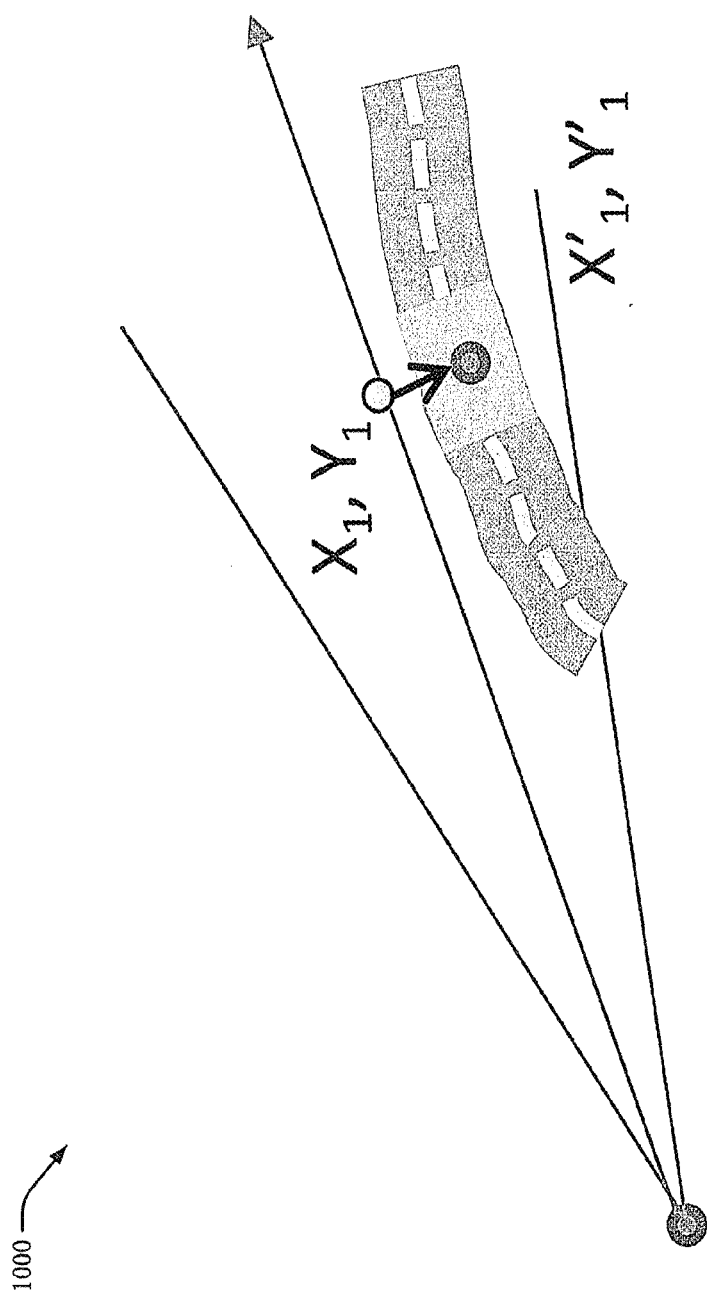
FIG. 10 illustrates a graph for determining constrained path error estimation adjustments within the dead reckoning-based location determination component of the location component of FIG. 1 for facilitating location determination employing vehicle motion data in accordance with one or more embodiments described herein.

Turning back to FIG. 4, if the path of location component 102 is constrained (e.g., location component 102 is in a tunnel region), at 416, dead reckoning-based location determination component 306 determines a path-constrained location and error, as described with reference to FIG. 10. Turning to FIG. 10, a constraint algorithm with constrained adjustment is shown. Existing map location request devices seem to make use of constraints to improve location estimates. The difference here is that embodiments herein use constraints to improve dead reckoning. In this example, the projected $X_1, Y_1$ can be corrected to a new $X'_1, Y'_1$ with angular position constrained by the road (here, corrected below the original estimated line of travel). The traveled distance can be refined by using the known and possibly non-linear path of the constraining road (here, corrected closer to the previous starting point because of a winding road). While the rectangle 1002 shown in the FIG. 10 is centered on the $X_1, Y_1$ location, per the winding road rationale, the correction arrow from $X_1, Y_1$ to $X'_1, Y'_1$ can be pointed slightly toward the previous location (e.g., an arrow pointing downward and to the left) rather than perpendicular to the direction of travel. The uncertainty region can shrink to the width of the constraining road and the distance uncertainty remains essentially the same as before.

At 412, method 400 determines whether the path of car 104 is constrained. If the path is not constrained, at 414, dead reckoning-based location determination component 306 determines an error estimate that is not constrained to the path. Error estimation component 208 can compute the error.

Figure 9:
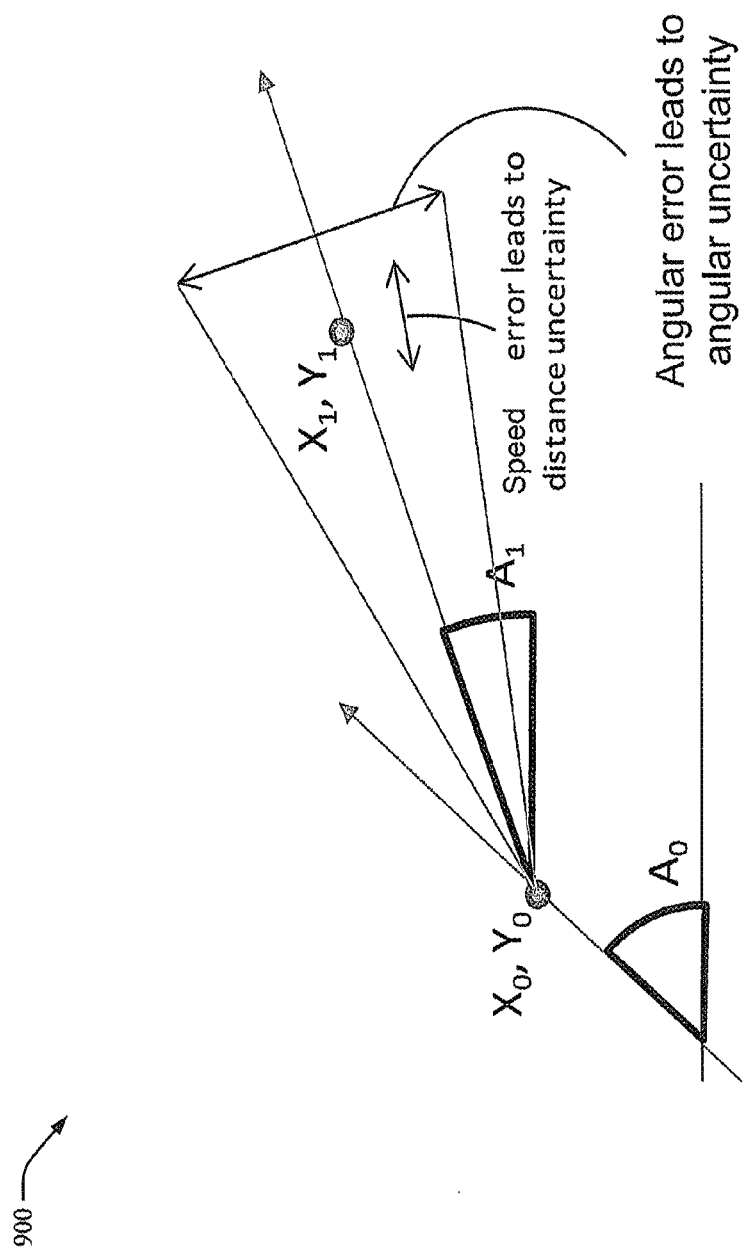
FIG. 9 illustrates a graph for determining unconstrained path error estimation adjustments within the dead reckoning-based location determination component of the location component of FIG. 1 for facilitating location determination employing vehicle motion data in accordance with one or more embodiments described herein.

In various embodiments, the error estimate calculations can be as shown in FIG. 9. FIG. 9 illustrates a graph for determining unconstrained path error estimation adjustments within the location component of FIG. 1 for facilitating location determination employing vehicle motion data in accordance with one or more embodiments described herein.

Repetitive description of like elements employed in other embodiments described herein is omitted for sake of brevity.

Turning now to FIG. 9, an approach to calculate unconstrained error estimation is shown. As shown, the speed error leads to distance uncertainty. The angular error leads to angular uncertainty. The uncertainty region can be expressed as an oval, arc, trapezoid or any suitable shape in various embodiments to reflect distribution curves of errors over the region. For example, for non-uniform probability distributions of error mean there are bell curve effects where the most likely true answer is somewhere in the middle and less likely on the edges, and this can lead to a practical error region being described more usefully as an oval.

Turning back to FIG. 4, for path-constrained embodiments and path unconstrained embodiments, at 418, method 400 includes dead reckoning-based location determination component 306 determining whether the location information generated is acceptable quality. If the location information is not acceptable quality, at 420, an error message is output (e.g., "no location"), and the process of method 400 can begin again. In some embodiments, error will be accumulated so much that dead reckoning will not provide a quality result and location component 102 returns an error or an error message.

Turning to FIG. 2, error estimation component 208 can compute error for location component 208 estimates. The errors generated by dead reckoning-based location determination component 306 are able to be estimated by numerous different known methods. For example, in one embodiment, a calculation of averages and errors can be determined by well-known effects of coarse data in stepwise calculation practices (e.g., linear interpolation error, loss of one endpoint of data, bias from choosing measurement at beginning/end/within an interval, less error when steps are small). Systemic errors resultant from the sensors of car 104 can be factored into the errors generated in the location information determined by dead reckoning-based location determination component 306 as well.

In one embodiment, error estimates can be determined and/or employed as follows. At the first step, beacon-based location information can be continually and/or frequently calculated. During normal beacon-based (and presumably the highest accuracy) operation, location component 102 deduces its own location based on the beacon.

As an alternate, a different first step can be performed. In this case, sensor-based information can be continually and/or frequently retrieved about car 104 by location component 102. For example, location component 102 collects sensor data (from car 104 and/or car data component 106) such as tilt, side winds (if car 104 has wind sensors), acceleration during normal operation (in some embodiments, the collection of sensor-based information is performed concurrently with beacon-based operation). Ongoing location estimates based on sensor data alone can be generated by location component 102.

Some inputs such as steering wheel rotation and vehicle speed lend themselves to immediate calculation of an estimated location. Some inputs such as road tilt may require initial assumed parameters and those assumed parameters can be refined over time through learning. In the case of car 104 moving along a straight road with wheels straight, some left tilt in the road may cause car 104 to veer left even if the wheels are straight. In other words, tilt (and side winds) can be a contributing variable along with steering wheel rotation in the calculation of direction changes.

At step 2, if a pair of beacon-based and sensor-based location data is available, location component 102 can compare them. At each point in time (or, in various embodiments, at one or more points in time) when data is available, the beacon-based location and sensor-based estimated location are compared. The difference in location between the beacon-based location determination and the sensor-based estimated location determination can represent the error between the best-available beacon-based location and the sensor-based estimated location.

At step 3, individual error values can be collected by location component 102 into a statistical distribution. At step 4, data can be further analyzed to refine error estimates as a function of sensor data combinations. More sophisticated analysis of the sensor data (e.g., evaluating individual input sensitivities or non-linearities) can produce more refined error estimates that can be applied when suitably conditioned sensor data are encountered.

At step 5, estimation bias (in the sensors from which the raw vehicle data was received for calculation of the sensor-based location) can be calculated and location estimates can be corrected by location component 102. The estimated location data can also exhibit statistics such as a mean value that can be compared to the beacon-based location. If the estimates are consistently biased, a learned correction factor can be introduced into the sensor-based calculations generated by location component 102.

At step 6, upon request, a sensor-based location estimate can be produced. This estimate can include a built-in bias correction at location component 102. The location estimate generated by location component 102 can be accompanied by a simplified error estimate or more detailed error distribution in some embodiments.

Turning back to FIG. 4, if the location information is of acceptable quality, at 422, the method includes dead reckoning-based location determination component 306 determining a new location, direction and velocity information. In some embodiments, a new error estimate is also determined.

Figure 5:
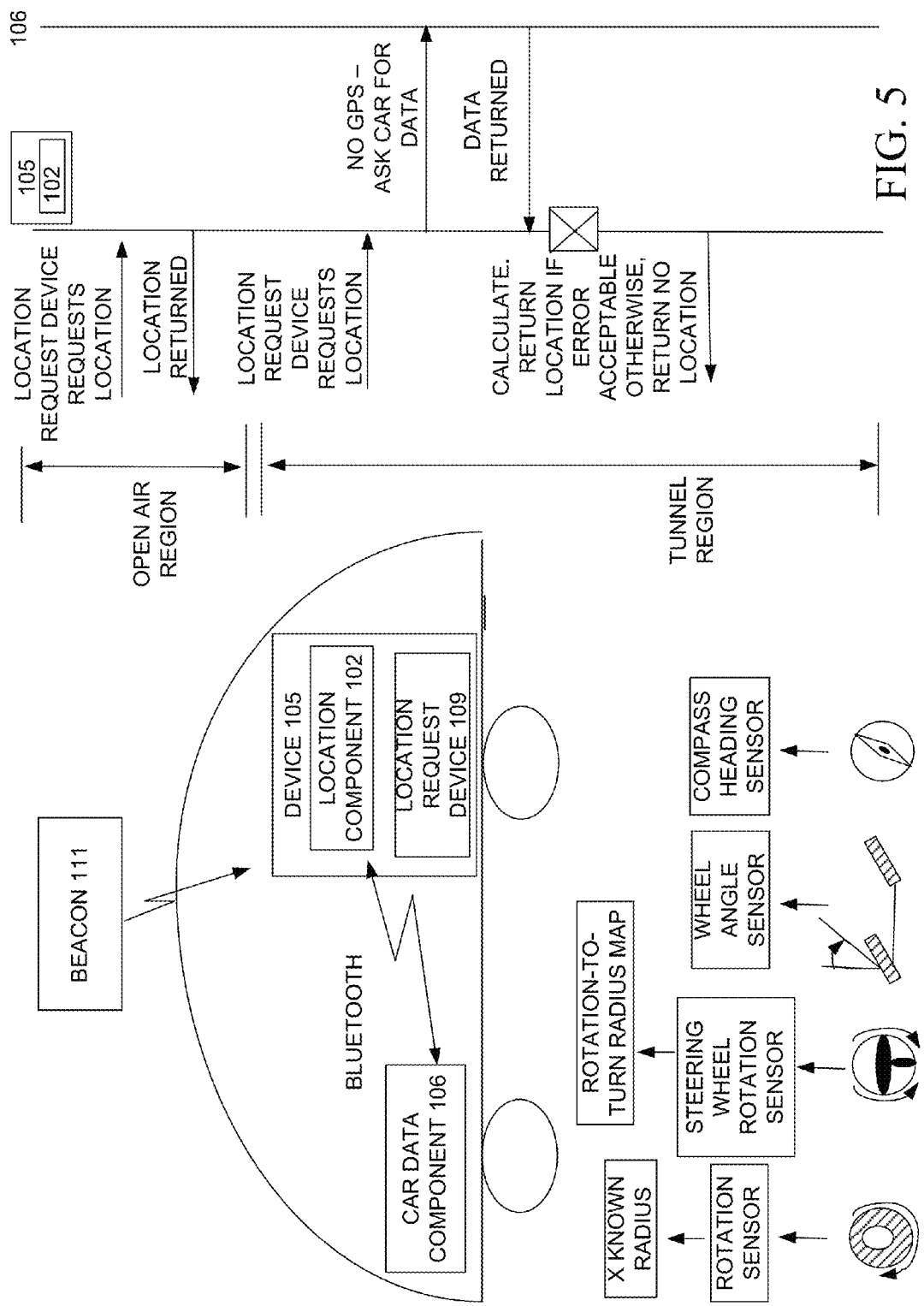
FIG. 5 illustrates an example diagram showing various embodiments of interaction between the location component and car data component of FIG. 1 as described with reference to FIG. 4 for facilitating location determination employing vehicle motion data in accordance with one or more embodiments described herein.

FIG. 5 illustrates an example diagram showing various embodiments of interaction between the location component and car data component of FIG. 1 as described with reference to FIG. 4 for facilitating location determination employing vehicle motion data in accordance with one or more embodiments described herein. Repetitive description of like elements employed in other embodiments described herein is omitted for sake of brevity.

Location component 102 requests from car data component 106 raw vehicle data to supplement a lost GPS beacon. As shown, in some embodiments, the location component 102 can access the beacon 111. However, in other embodiments, the location component 102 is unable to access the beacon 111 and requests raw vehicle data from car data component 106. Examples of raw vehicle data that car data component 106 can access can include, but is not limited to, known radius, rotation-to-turn radius map, wheel angle and compass heading. Other types of raw vehicle data are also possible and the above-listed types of data are mere examples.

The ladder diagram further elaborates the example by showing an on-demand case in which location request device 109 electrically or communicatively coupled to location component 102 (which can be located at device 105) generates a request for location (or generally indicates a need for location information for device 105 (or for location component 102)). In other embodiments, the case need not be an on-demand case in which the request received is at car data component 106 from location component 102. Rather, the car data component 106 can originate updates regarding raw vehicle data on its own initiative as well.

As shown, in the open air region, the request from location request device 10 is met with a location determination by location component 102 (possibly through access of the beacon 111 since the device 105/location component 102 is in the open air region and location component 102 can utilize the beacon 111 to deduce the location of the location component 102). In the tunnel region, the request from location request device 109 leads to a request from the location component 102 to the car data component 106 for raw vehicle data. The raw vehicle data is employed by location component 102 to determine location of location component 102. If the location component 102 determines that the error for the estimated location is acceptable, the estimated location information is provided to the location request device by location component 102. If the location component determines that the error for the estimated location is not acceptable, a message or other indicator will be output from location component 102 indicating that no location will be output from location component 102.

Location request device 109 can be located within device 105 or location component 102 in some embodiments. In some embodiments, location request device 109 can be located at any number of different locations and be merely communicatively coupled to device 105 and/or location component 102 to allow location request device 109 to generate a request for location.

Figure 11:
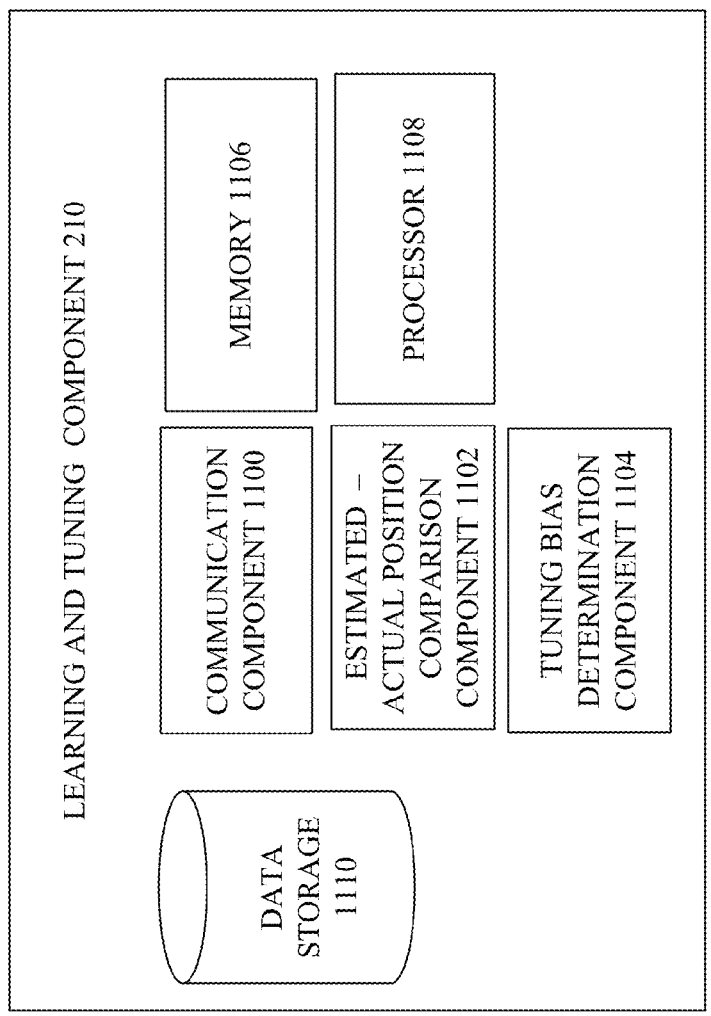
FIG. 11 illustrates an example block diagram of a learning and tuning component of the location component of FIG. 1 for facilitating location determination employing vehicle motion data in accordance with one or more embodiments described herein.

FIG. 11 illustrates an example block diagram of a learning and tuning component of the location component of FIG. 1 for facilitating location determination employing vehicle motion data in accordance with one or more embodiments described herein. Repetitive description of like elements employed in other embodiments described herein is omitted for sake of brevity.

Learning and tuning component 210 can include communication component 1100, estimated-actual position comparison component 1102, tuning bias determination component 1104, memory 1106, processor 1108 and/or data storage 1110. In various embodiments, one or more of communication component 1100, estimated-actual position comparison component 1102, tuning bias determination component 1104, memory 1106, processor 1108 and/or data storage 1110 can be electrically and/or communicatively coupled to one another to perform one or more functions of learning and tuning component 210.

Communication component 1100 can receive and/or access information indicative of estimated and/or actual raw vehicle data for car 104. Communication component 1100 can determine error estimation or tuning/bias information about sensors in car 104.

Estimated-actual position comparison component 1102 can compare an estimated location for car 104 based on information measured/sensed at car 104 with actual position of car 104 retrieved from beacon-based information. Based on the estimated and actual position of estimated-actual position comparison component 1102 can calculate tuning biases for which adjustment should be made to improve upon systemic errors in the sensors of car 104 that are employed to perform sensing/measurement of position, velocity and/or direction or in other random errors of measurement or reporting. For example, estimated-actual position comparison component 1102 can conduct experiments by assuming that beacon connectivity is lost, proceeding with the dead reckoning algorithm based on the sensed/measured position, velocity and/or direction from car 104 and determining how the dead-reckoned/estimated position compares with the actual position of car 104.

If the actual beacon-based position is of accuracy greater than a defined value, estimated-actual position comparison component 1102 can generate a signal that corrects the location information generated by location component by a defined amount indicative of the tuning bias. In some embodiments, although completely optional, tuning bias determination component 1104 can generate tuning and learning bias adjustment information to guide car data component 106 to refine sensed/measured position, velocity and/or direction estimates of systemic and random errors in the sensors of car 104. For example, tuning bias determination component 1104 can generate information to address misaligned tires of car 104 that cause the car 104 to drift to one side even when the wheel of car 104 is reporting that the wheel of car 104 is straight, or account for tire radius or other errors that do not report odometer distance accurately, or revise the directional adjustment factor for left/right road tilt that may be different on a new set of tires of car 104.

Memory 1106 can store computer-executable instructions that can be executed by processor 1108. For example, memory 1106 can store instructions for calculating tuning bias, comparing estimated position and actual position and the like. Processor 1108 can process computer-readable storage medium computer-executable instructions to perform one or more of the functions described herein with reference to location component 102. For example, processor 1108 can process instructions for computation of bias for adjustment of sensors or the like. Data storage 1112 can store information indicative of estimated position, actual position, tuning bias information, information for adjustment of device sensors and the like.

Figure 12:
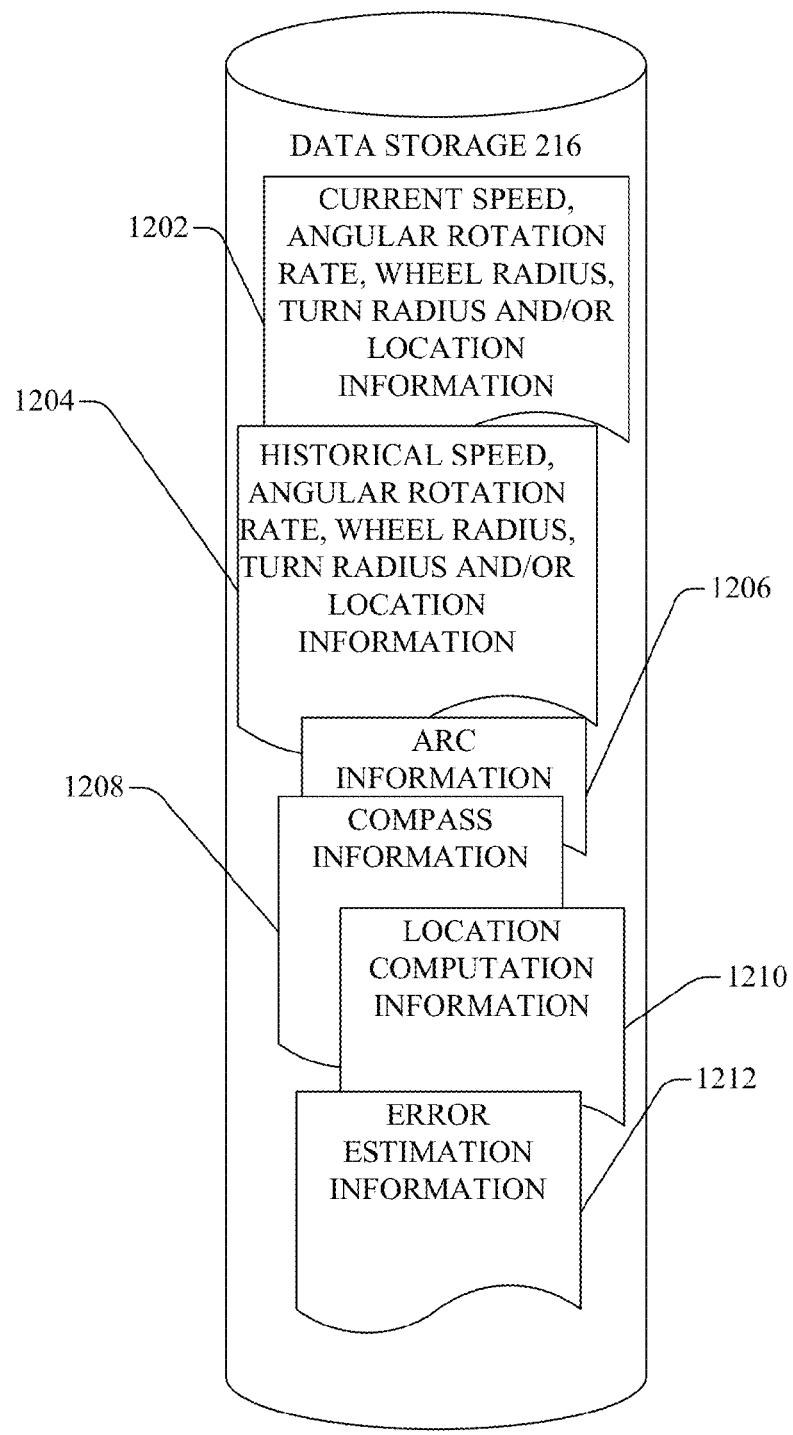
FIG. 12 illustrates an example data storage of the location component of FIG. 2 in accordance with one or more embodiments described herein.

FIG. 12 illustrates an example data storage of the location component of FIG. 1 in accordance with one or more embodiments described herein. Current velocity, turn radius and/or location information 1202 includes current velocity, turn radius and location information (e.g., x, y coordinates) about a vehicle (or about location component 102). Historical velocity, turn radius and/or location information 404 includes past velocity, turn radius and location information (e.g., x, y coordinates) about a vehicle (or about location component 102). Arc information 1206 can include arc information about car 104. Compass information 1208 can include compass information about car 104.

Location computation information 1210 can include information generated about the estimated location of location component 102, location request device 109 and/or, in some embodiments, although optional, about car 104. Error estimation information 1212 includes information about errors computed for the location and/or velocity and/or turn radius of location component 102, location request device 109, car 104, whether an amount of error exceeds a defined value and thus location information should not be transmitted to the device or the like.

Although cars/vehicles are described herein as examples of the devices for which location determination employing vehicle motion data transmitted over communication networks can be employed, in other embodiments, location determination can be provided for any number of different objects. Any source of raw data that can be sensed/measured/retrieved from the object can be used to derive location. Use cases exist for any cases in which a raw data source is coincident with a user device having a location component and in close proximity to one another (which can be enforced by a cable or short range radio connection). The raw data source at the object can be leveraged for location determination in the absence of beacons. One example of an object for which raw vehicle data can be employed for location determination in beacon-less cases is a subway car where the subway car may report measured vehicular data and/or information on distance to the next stop. This information can be combined with map information for the location component 102 to derive location. Extending beyond cases of visual maps or spoken navigation instructions, another example could be a situation in which a visually-impaired or a hearing-impaired person may rely on location cues from a smart phone having location component 102, and the location cues can be provided in a way that the person can understand rather than audible or visual information from a vehicle that the visually-impaired or hearing-impaired person cannot use.

Figure 13:
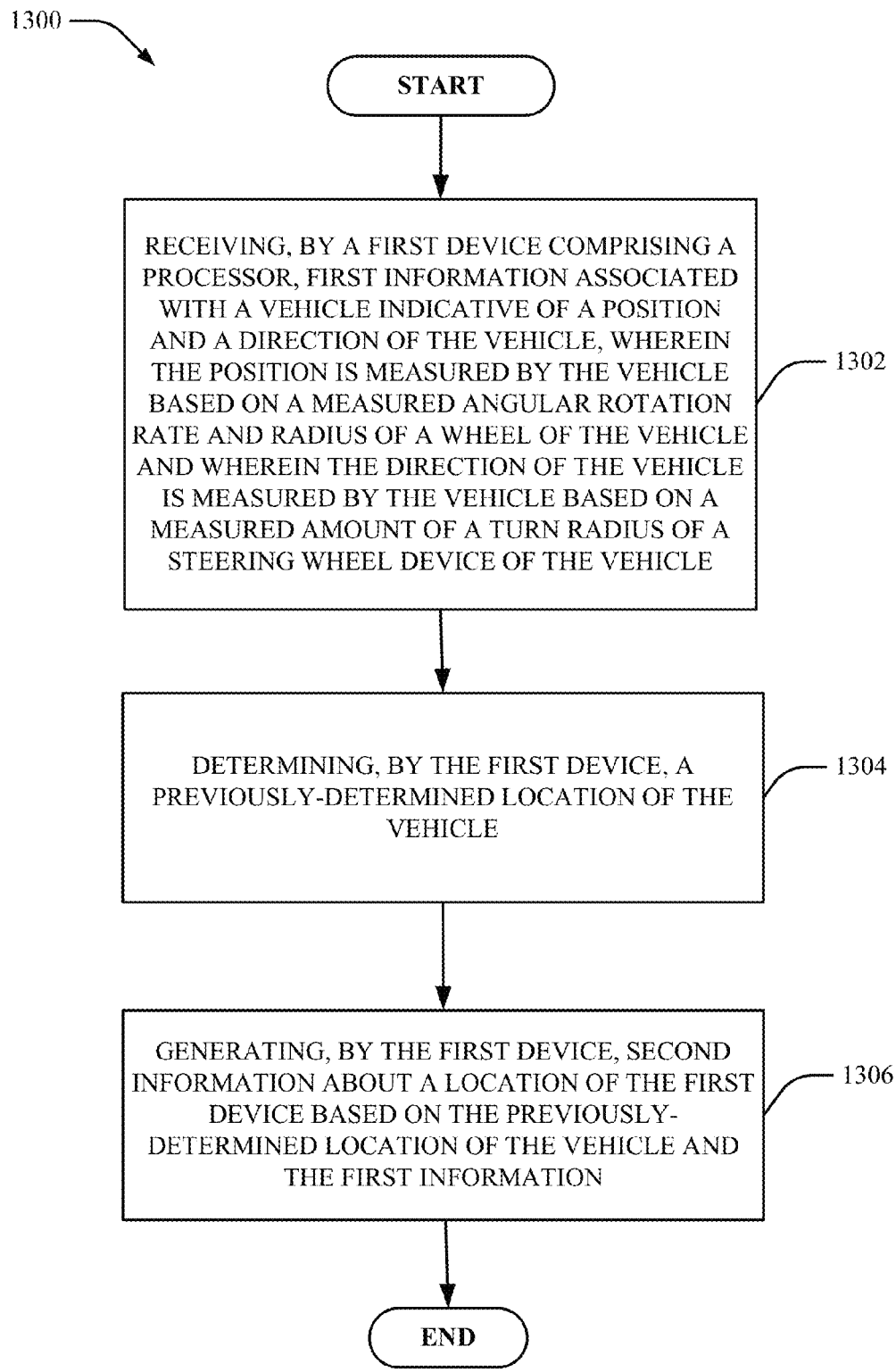
FIGS. 13-16 illustrate example flowcharts detailing methods facilitating location determination employing vehicle motion data in accordance with one or more embodiments described herein.

FIGS. 13-16 illustrate examples of flowcharts detailing methods facilitating location determination employing vehicle motion data in accordance with one or more embodiments described herein. Turning first to FIG. 13, at 1302, method 1300 can include receiving, by a first device comprising a processor, first information associated with a vehicle indicative of a position and a direction of the vehicle, wherein the position is measured by the vehicle based on a measured angular rotation rate and radius of a wheel of the vehicle and wherein the direction of the vehicle is measured by the vehicle based on a measured amount of a turn radius of a steering wheel device of the vehicle. In some embodiments, the direction can be determined by the vehicle based on a reading at a compass located at the vehicle.

At 1304, method 1300 can include determining, by the first device, a previously determined location of the vehicle. For example, historical information about the location of the vehicle can be retrieved. The first device can be the location component 102 discussed with reference to FIG. 1 in some embodiments.

At 1306, method 1300 can include generating, by the first device, second information about a location of the first device based on the previously determined location of the vehicle and the first information. For example, the location information that was previously determined can be adjusted to new estimated location information based on information sensed at the vehicle (e.g., the angular rotation rate and radius of the wheel of the vehicle), which indicates how fast the vehicle is traveling (and/or is an approximation of how fast the vehicle has been traveling since the previously determined location). The new position of the first device can be computed accordingly. In some embodiments, although not shown, the first device can infer the location of the vehicle based on the determined location of the first device if the first device and the vehicle are collocated.

Figure 14:
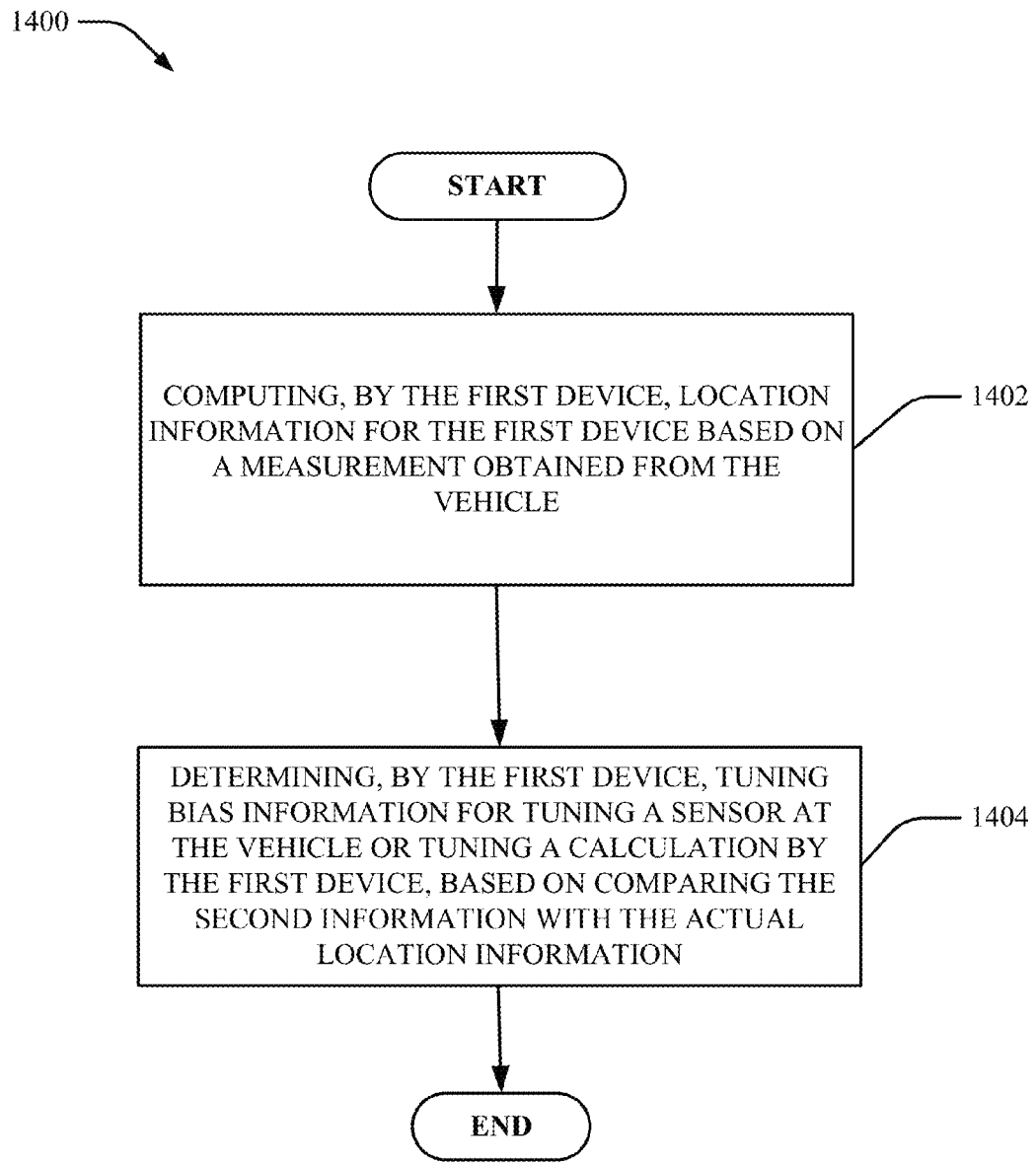

Turning now to FIG. 14, at 1402, method 1400 can include computing, by the first device, location information for the first device based on a measurement obtained from the vehicle. For example, the vehicle can include one or more sensors that can measure various aspects of the operation of the vehicle (e.g., wheel speed, steering wheel device turn radius, direction information from a compass located at vehicle). The first device can compute location information for the first device based on the measurement obtained from the vehicle compared to the previously determined location information for the vehicle. For example, the location information that was previously determined can be adjusted to new estimated location information based on the wheel speed of the vehicle, which indicates how fast the vehicle is traveling (and/or is an approximation of how fast the vehicle has been traveling since the previously determined location). The new position can be computed accordingly. In various embodiments, the steering wheel device turn radius and/or direction information from a compass can be employed as a factor in the direction of the second direction (and corresponding position).

At 1404, method 1400 can include determining, by the first device, tuning bias information for tuning a sensor or tuning a calculation at the vehicle based on comparing the second information with the actual location information. In some embodiments, the tuning step at 1404 can re-tune a sensor, or can allow the sensor to operate as-is and instead tune the calculation by the first device.

Figure 15:
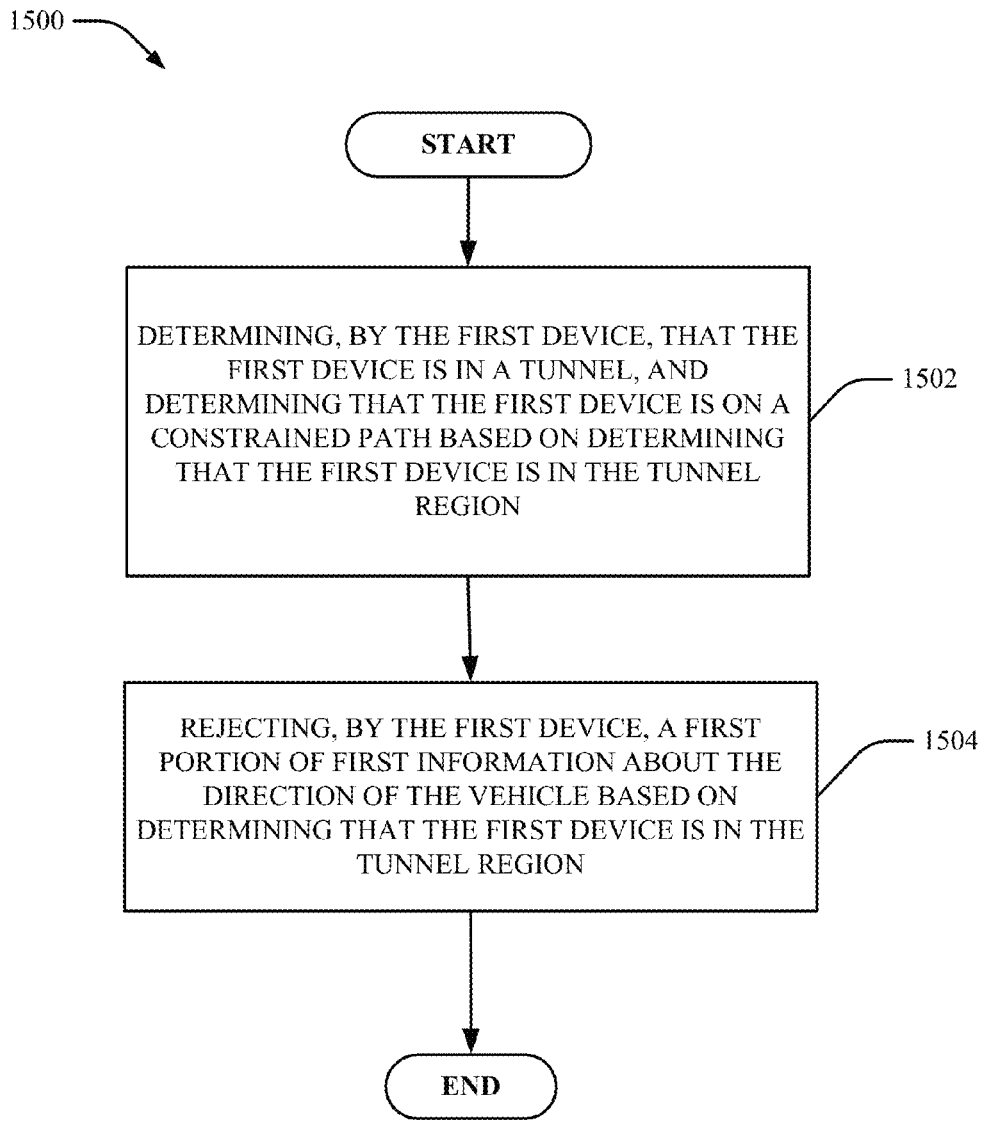

Turning now to FIG. 15, at 1502, method 1500 can include determining, by the first device, that the first device is in a tunnel region, and determining that the first device is on a constrained path based on determining that the first device is in the tunnel region. A tunnel region can be an area within a tunnel, subway or the like. For example, the determination that the first device is in a tunnel region can be indicative that the first device is on a constrained path since the first device is constrained to a limited path within the tunnel region.

At 1504, method 1500 can include rejecting, by the first device, a first portion of first information about the direction of the vehicle based on determining that the first device is in the tunnel region. The first information can include position, velocity and direction information and the first portion of the first information that is rejected can be the direction information. For example, since the first device (and therefore the vehicle, since the first device and the vehicle are collocated) is in a tunnel, the first device can decide to forego use of the direction information from the vehicle since the direction of the vehicle is typically constrained by the direction of the pathway within the tunnel region. To be able to make constraint-related decisions as dead-reckoning proceeds, some amount of map, road and/or related information can be cached ahead of time (and is typically included in such mapping location request devices because of the look-ahead nature of the visual presentation surrounding the current location).

Although not shown, in some embodiments, the method 1500 can include determining the location of the first device based on the data from the vehicle.

Figure 16:
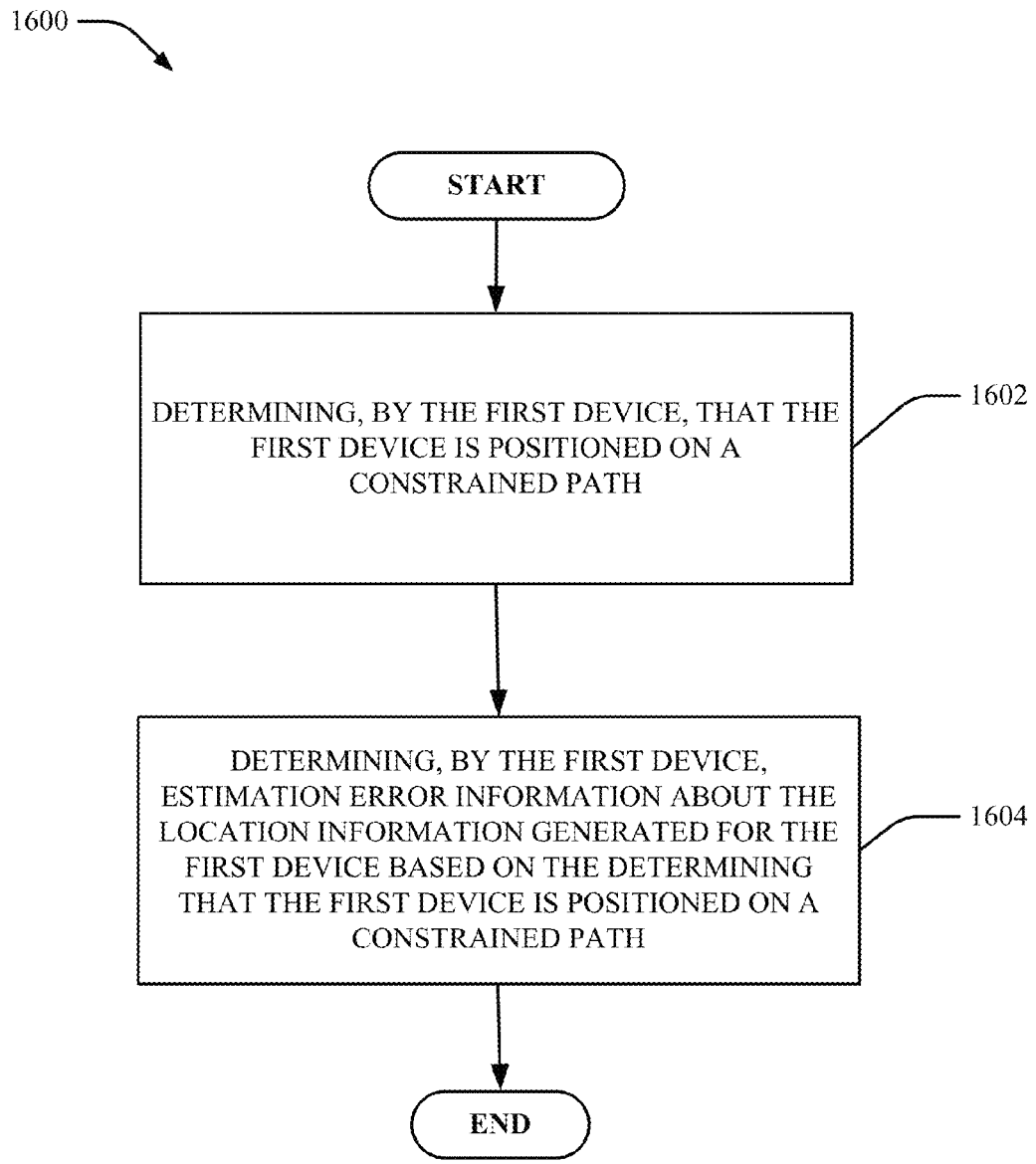

Turning now to FIG. 16, at 1602, method 1600 can include determining, by the first device, that the first device is positioned on a constrained path. At 1604, method 1600 can include determining, by the first device, estimation error information about the location information generated for the first device based on the determining that the first device is positioned on a constrained path. For example, as shown in FIG. 8, the projected $X_1, Y_1$ location information indicative of the generated position of the vehicle can be corrected to a new $X'_1, Y'_1$ with angular position constrained by the path on which the first device is traveling (since the first device and the vehicle are collocated). The traveled distance can be refined by using the known and possibly non-linear path of the constraining road. The uncertainty region indicative of the error estimation information can be reduced to the width of the constraining road in some embodiments.

Figure 17:
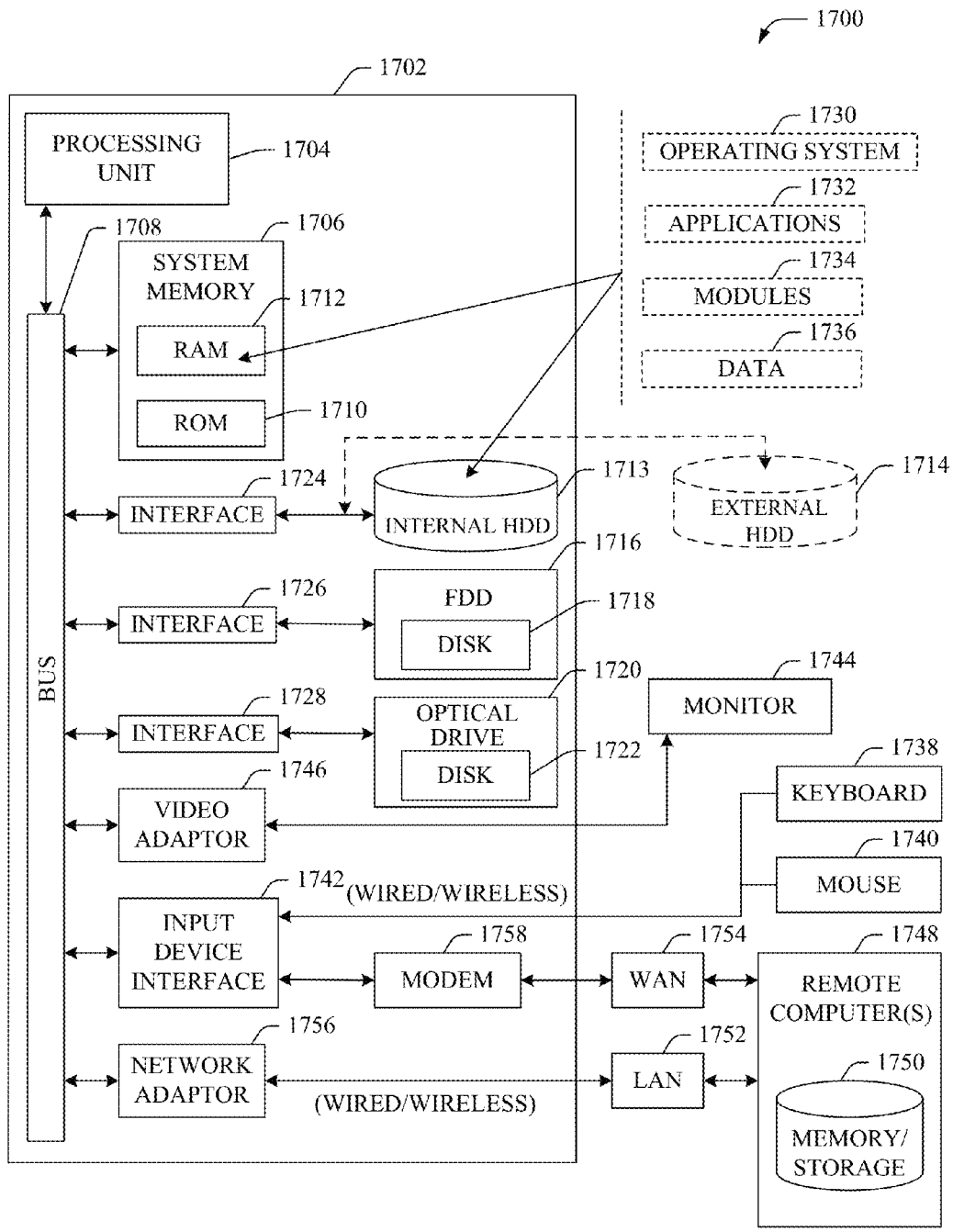
FIG. 17 illustrates an example block diagram of a computer operable to facilitate location determination employing vehicle motion data in accordance with one or more embodiments.

FIG. 17 illustrates an example block diagram of a computer operable to facilitate location determination employing vehicle motion data in accordance with one or more embodiments. For example, in some embodiments, the computer can be or be included within any number of components described herein including, but not limited to, location component 102 (or any components thereof).

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the embodiments described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface, respectively. The interface 1724 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

A mobile device can enter commands and information into the computer 1702 through one or more wired/wireless input devices, e.g., a keyboard 1738 and a pointing device, such as a mouse 1740. Other input devices (not shown) can include a microphone, an infrared (IR) remote control, a joystick, a game pad, a stylus pen, touch screen or the like. These and other input devices are often connected to the processing unit 1704 through an input device interface 1742 that can be coupled to the system bus 1708, but can be connected by other interfaces, such as a parallel port, an IEEE 1394 serial port, a game port, a universal serial bus (USB) port, an IR interface, etc.

A monitor 1744 or other type of display device can be also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1752 through a wired and/or wireless communication network interface or adapter 1756. The adapter 1756 can facilitate wired or wireless communication to the LAN 1752, which can also include a wireless AP disposed thereon for communicating with the wireless adapter 1756.

When used in a WAN networking environment, the computer 1702 can include a modem 1758 or can be connected to a communications server on the WAN 1754 or has other means for establishing communications over the WAN 1754, such as by way of the Internet. The modem 1758, which can be internal or external and a wired or wireless device, can be connected to the system bus 1708 via the input device interface 1742. In a networked environment, program modules depicted relative to the computer 1702 or portions thereof, can be stored in the remote memory/storage device 1750. It will be appreciated that the network connections shown are example and other means of establishing a communications link between the computers can be used.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components including the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments is intended to include, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by a first device comprising a processor, first information associated with a vehicle indicative of a position and a direction of the vehicle, wherein the position is measured by the vehicle based on a measured angular rotation rate and radius of a wheel of the vehicle and wherein the direction of the vehicle is measured by the vehicle based on a measured amount of a turn radius of a steering wheel device of the vehicle;
   determining, by the first device, a previously determined location of the vehicle; and
   generating, by the first device, second information about a location of the first device based on the previously determined location of the vehicle and the first information.

2. The method of claim 1, further comprising:
   determining, by the first device, that the first device is positioned along a constrained path; and
   determining, by the first device, estimation error information about the second information based on the determining that the first device is positioned on the constrained path.

3. The method of claim 2, wherein the first information is information associated with sensor adjustments based on measured tuning biases of respective sensors of the vehicle.

4. The method of claim 1, further comprising:
   determining, by the first device, whether beacon-based location information is available, and wherein the determining the previously determined location is based on a determination that the beacon-based location information is not available.

5. The method of claim 1, further comprising:
   receiving, by the first device, third information about the vehicle indicative of the direction of the vehicle, wherein the direction is a bias factor associated with a tilt of the vehicle.

6. The method of claim 5, wherein the generating the second information about the location of the first device is further based on the third information.

7. The method of claim 2, further comprising:
   determining, by the first device, that the first device is in a tunnel region, wherein the determining that the first device is on the constrained path is based on determining that the first device is in the tunnel region.

8. The method of claim 7, further comprising:
   rejecting, by the first device, a first portion of the first information about the direction of the first device based on determining that the first device is in the tunnel region.

9. The method of claim 1, further comprising:
   determining, by the first device, actual location information for the first device based on beacon-based location information; and
   determining, by the first device, tuning bias information for tuning a sensor of the vehicle based on comparing the second information with the actual location information.

10. An apparatus, comprising:
    a processor; and
    a memory that stores executable instructions that, when executed by the processor, facilitate performance of operations, comprising:
       receiving first information about a device indicative of a position and a direction of the device, wherein the position and the direction are determined by the device based on sensed data from the device;
       determining a previously determined location of the device;
       generating second information about a location of the apparatus based on the previously determined location of the device and the first information; and
       determining tuning bias information associated with modifying a sensor of the device based on comparing the second information with location information, wherein the sensor generates the sensed data.

11. The apparatus of claim 10, wherein the operations further comprise:
    determining whether the apparatus is positioned on a constrained path; and determining estimation error information about the second information based on a result of the determining whether the apparatus is positioned on the constrained path.

12. The apparatus of claim 11, wherein the first information is adjusted information based on a measured tuning bias of the sensor of the device.

13. The apparatus of claim 10, wherein the operations further comprise:
   determining whether beacon-based location information is available, and wherein the determining the previously determined location is based on a determination that the beacon-based location information is not available.

14. The apparatus of claim 10, wherein the operations further comprise:
   receiving third information about the device indicative of the direction of the device, wherein the direction is a bias factor associated with a sensed tilt of the device.

15. The apparatus of claim 11, wherein the operations further comprise:
   determining that the apparatus is in a tunnel region; and
   determining that the apparatus is on the constrained path based on the determining that the apparatus is in the tunnel region.

16. The apparatus of claim 15, wherein the operations further comprise:
   rejecting a first portion of the first information about the direction of the device.

17. The apparatus of claim 10, wherein the operations further comprise:
   computing the location information for the apparatus based on beacon-based location information.

18. A machine-readable storage medium, comprising executable instructions that, when executed by a processor, facilitate performance of operations, comprising:
   receiving first information associated with a second device indicative of a position and a direction of the second device, wherein the position is measured by the second device based on a measured angular rotation rate and radius of a wheel of the second device and wherein the direction of the second device is measured by the second device based on a measured amount of a turn radius of a steering wheel device of the second device;
   identifying previously determined position and direction information for the second device; and
   generating second information about the first device based on the previously determined position and direction information for the second device and the first information.

19. The machine-readable storage medium of claim 18, wherein the operations further comprise:
   determining estimation error information about the second information based on whether the first device is determined to be positioned on a constrained path.

20. The machine-readable storage medium of claim 18, wherein the operations further comprise:
   computing actual location information for the first device based on beacon-based location information; and
   determining tuning bias information for tuning a sensor of the second device based on comparing the second information with the actual location information.

* * * * *